JERE F. IRWIN,
INVENTOR.

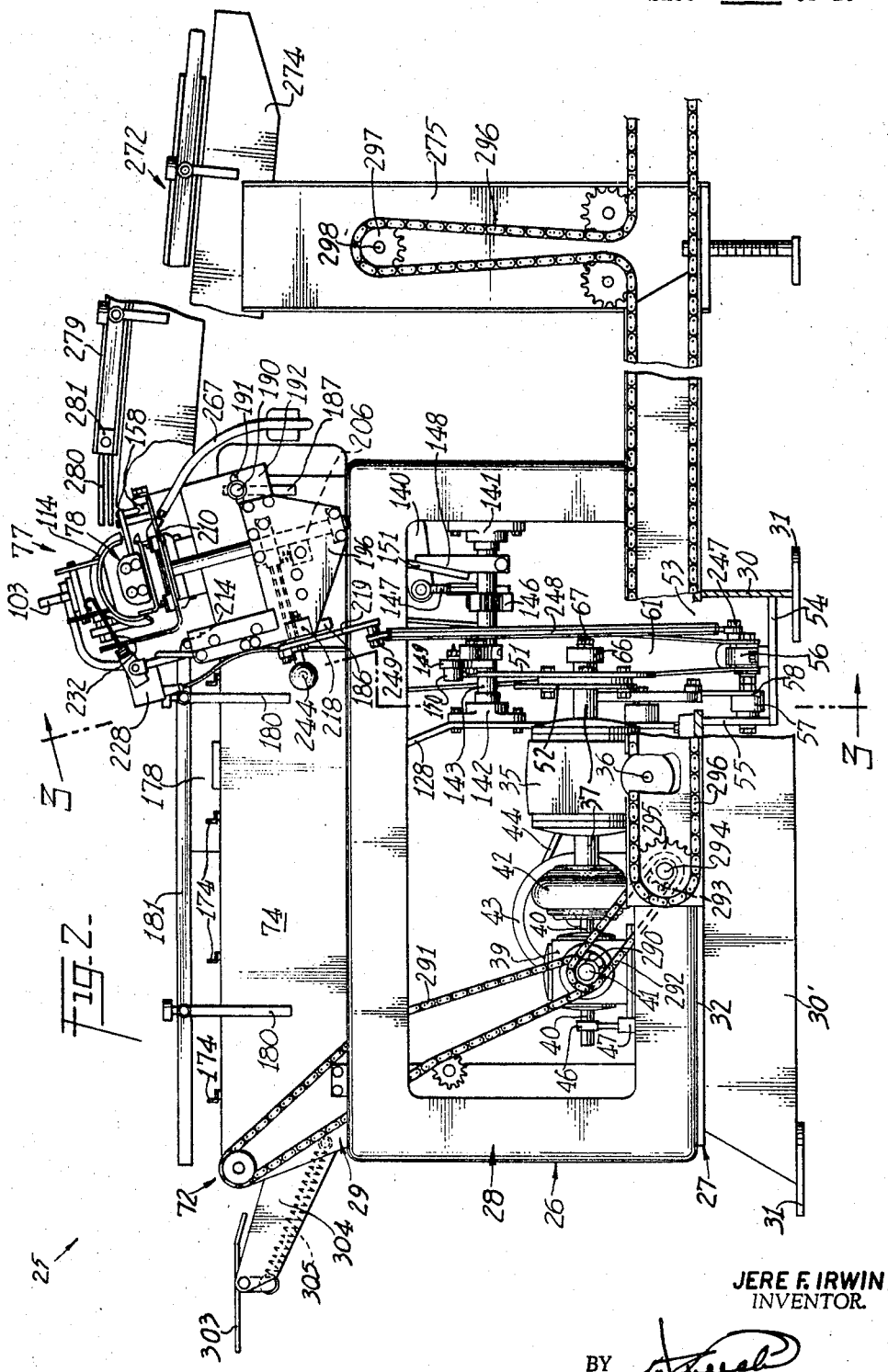
Fig. 2.
JERE F. IRWIN,
INVENTOR.
BY 
ATTORNEY.

BY
ATTORNEY.

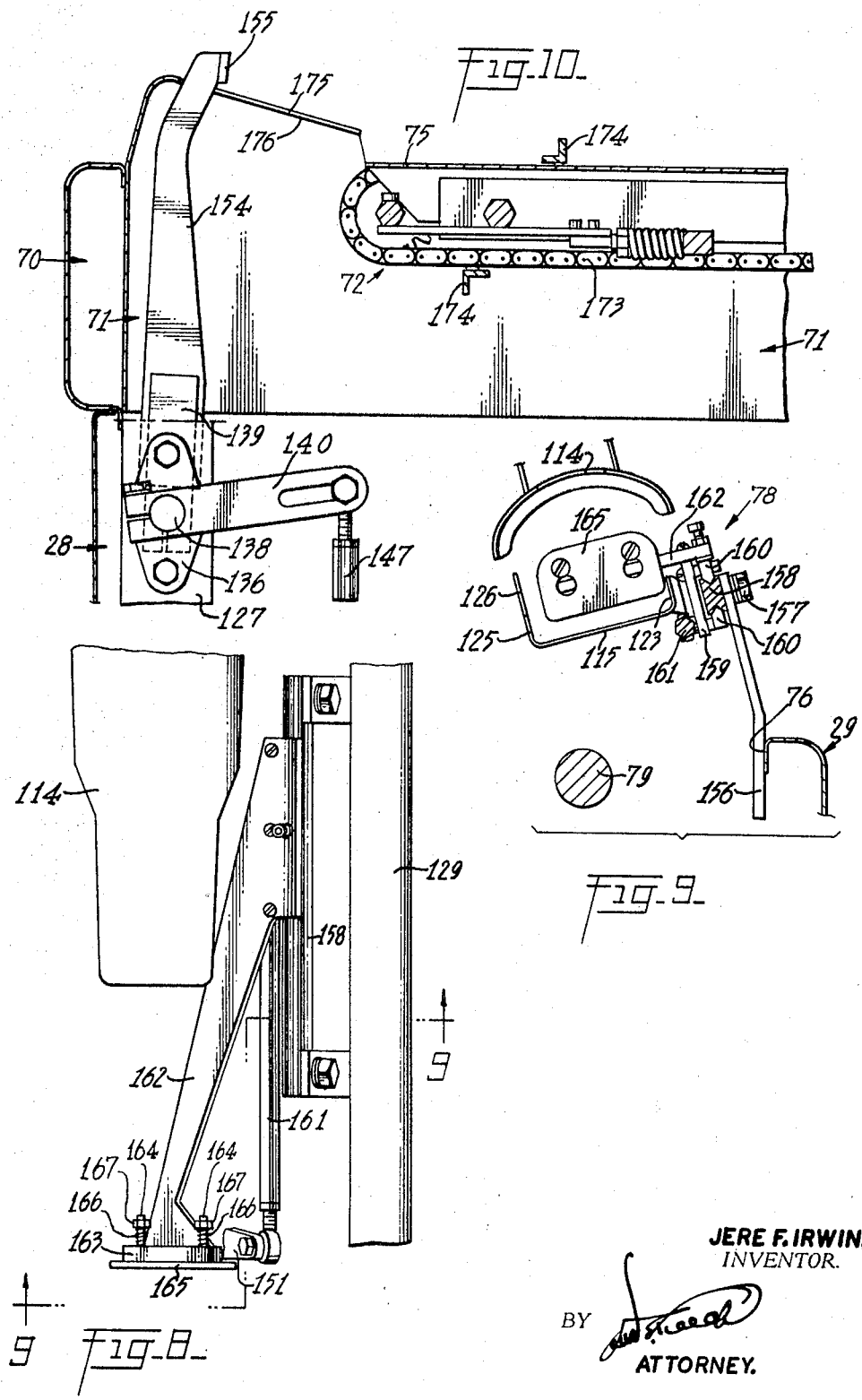

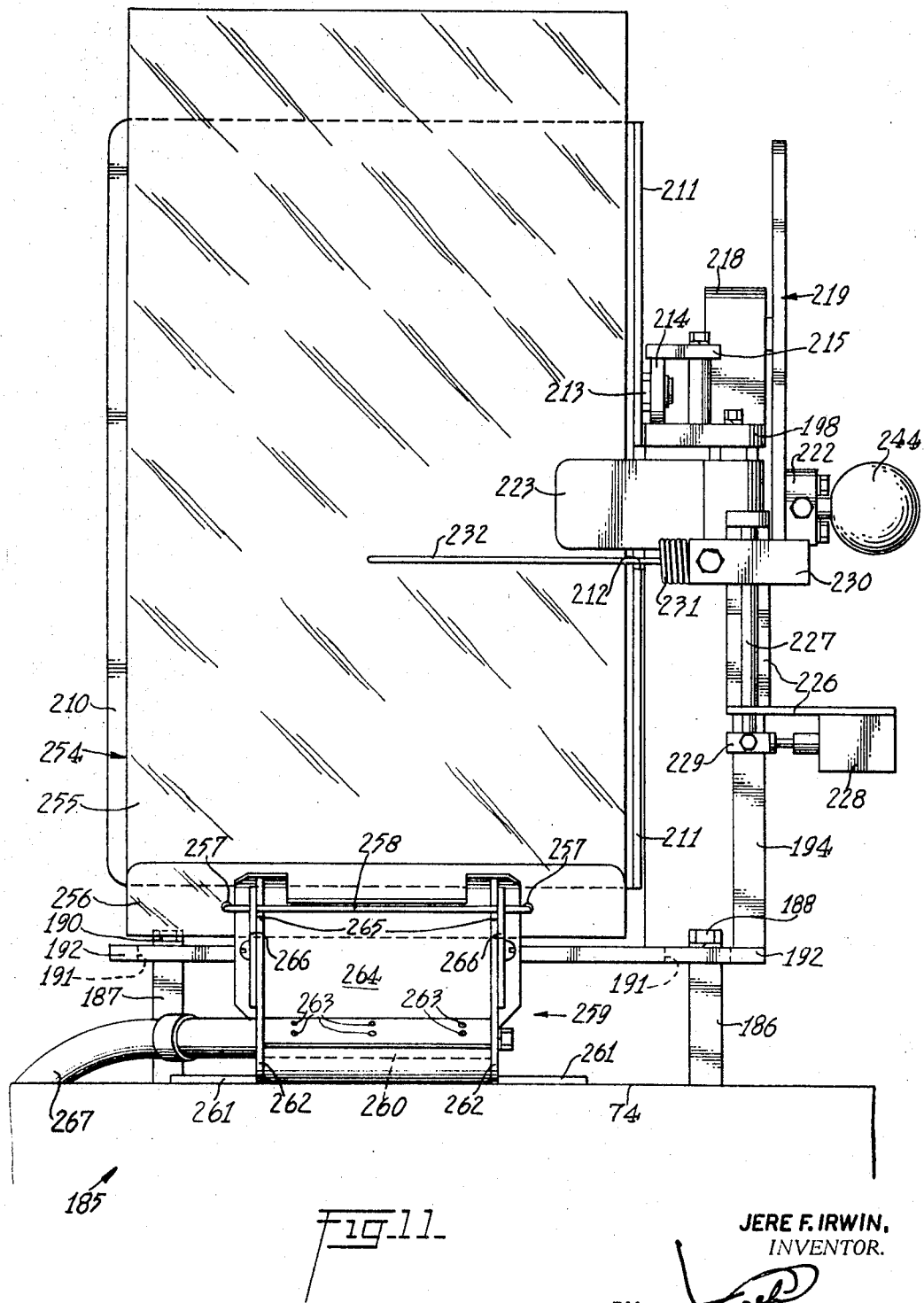

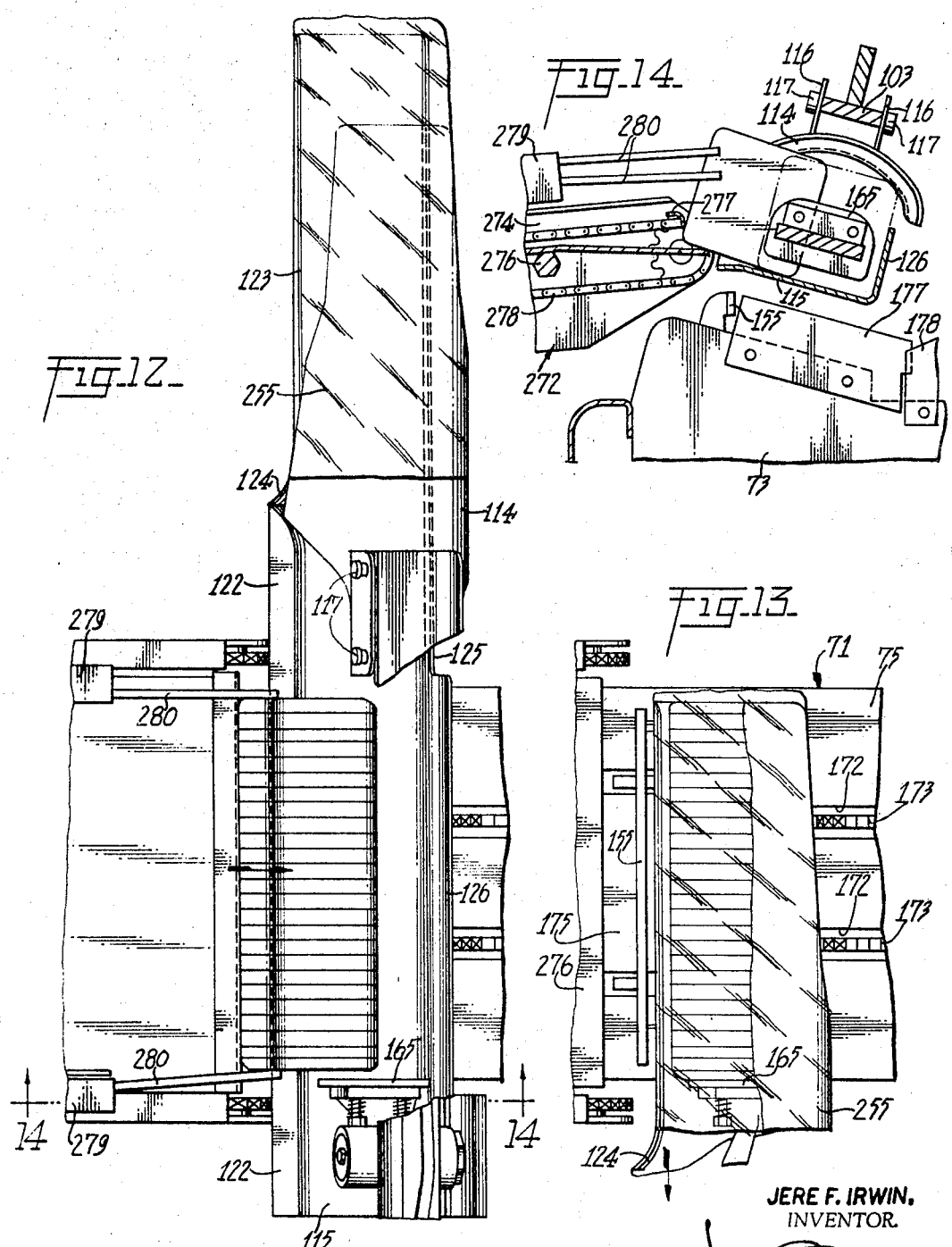

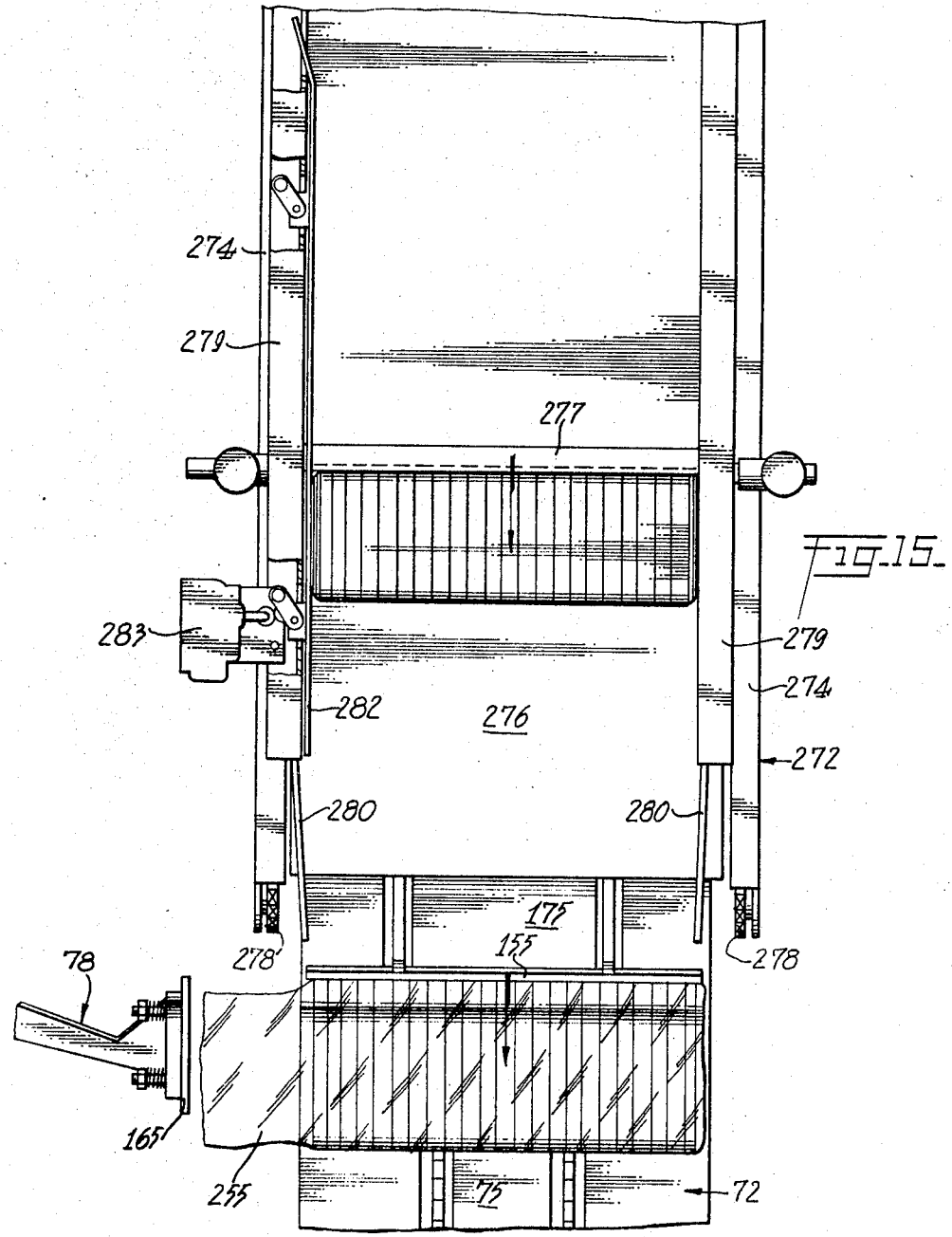

June 24, 1969 — J. F. IRWIN — 3,451,192
BREAD BAGGER
Filed Sept. 14, 1964
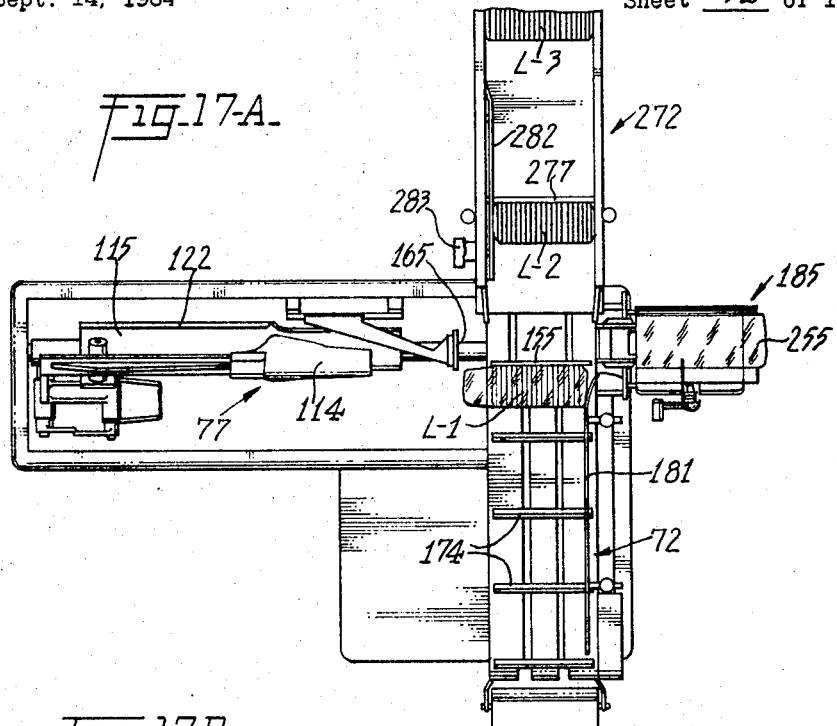
Fig. 17-A
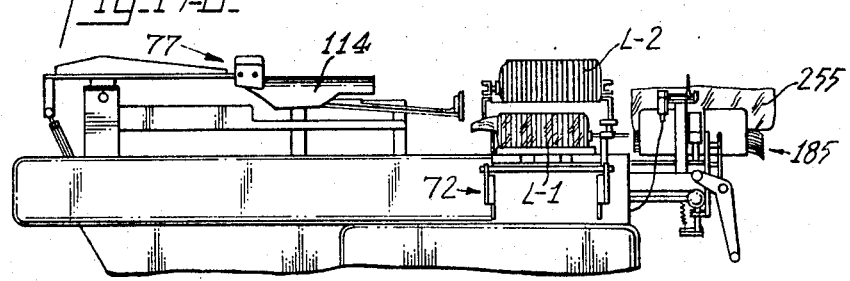
Fig. 17-B
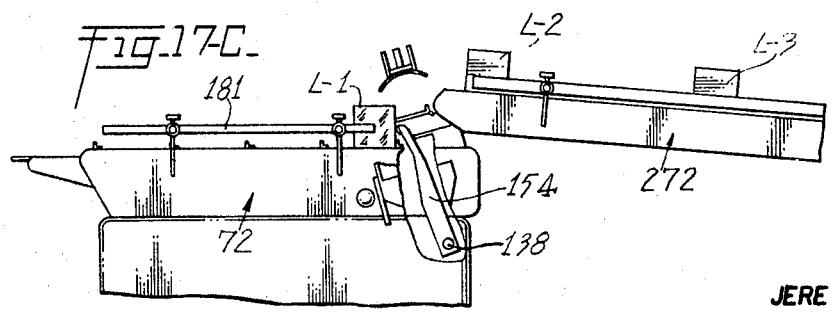
Fig. 17-C
JERE F. IRWIN,
INVENTOR.
BY
ATTORNEY.

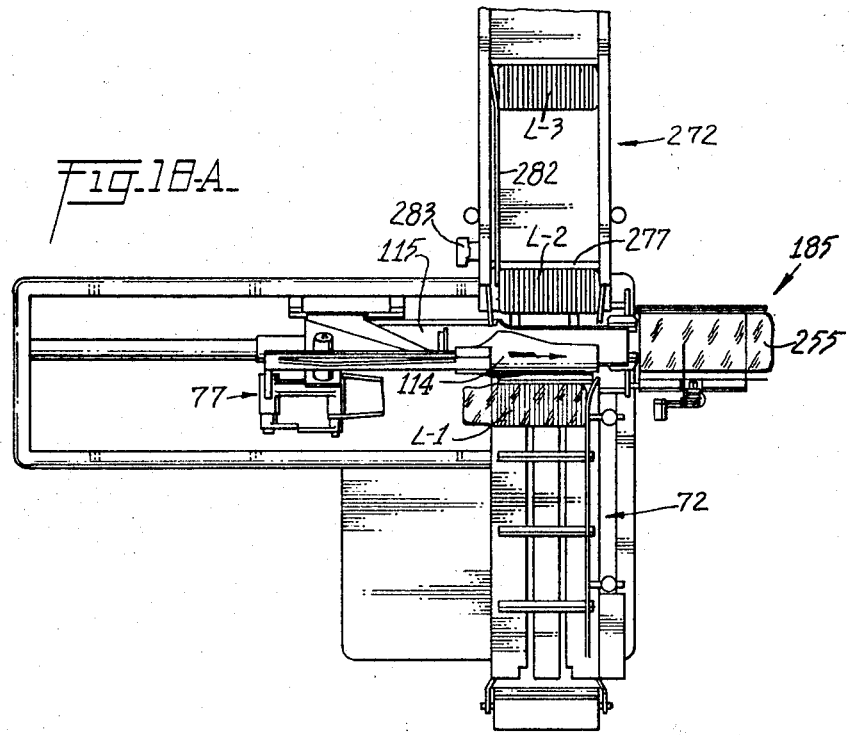
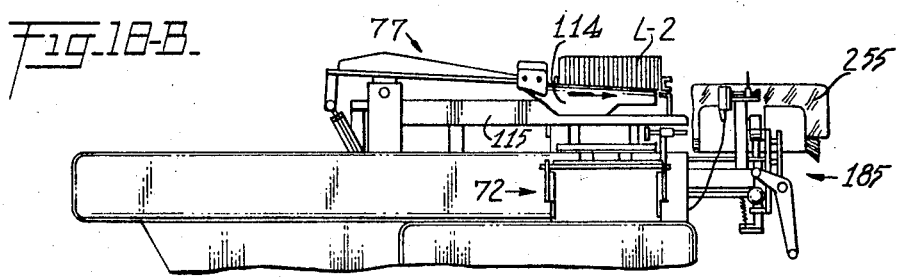
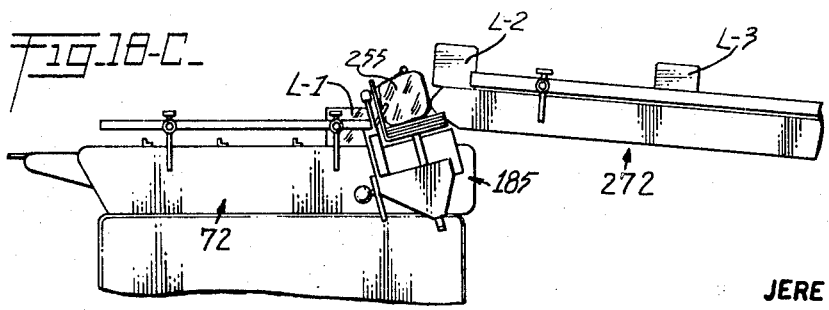

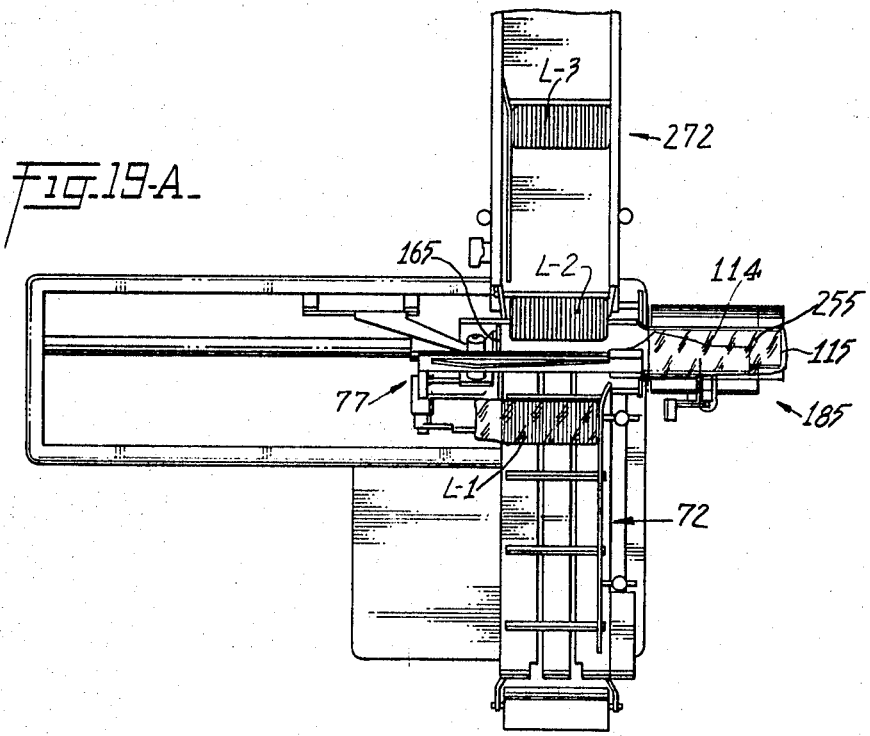
Fig.19-A
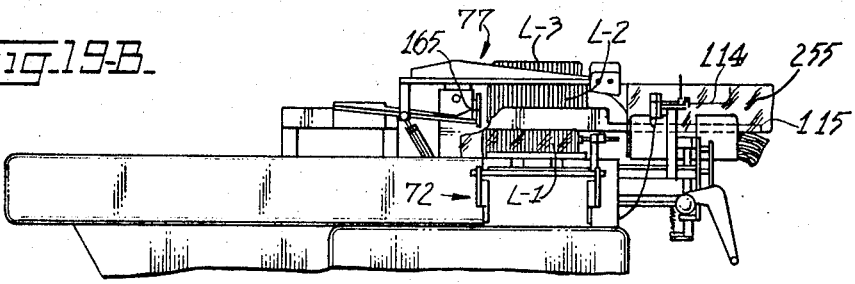
Fig.19-B
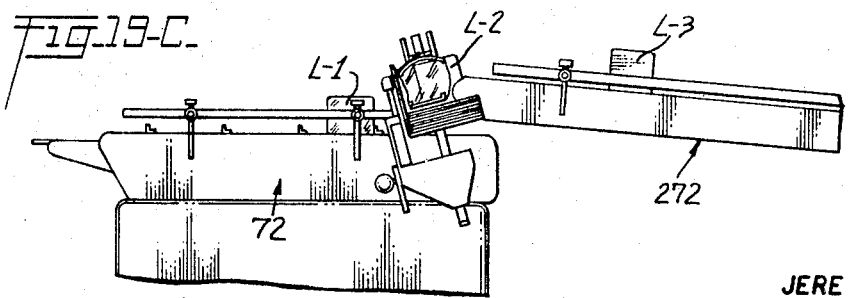
Fig.19-C
JERE F. IRWIN,
INVENTOR.
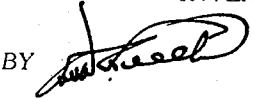
ATTORNEY.

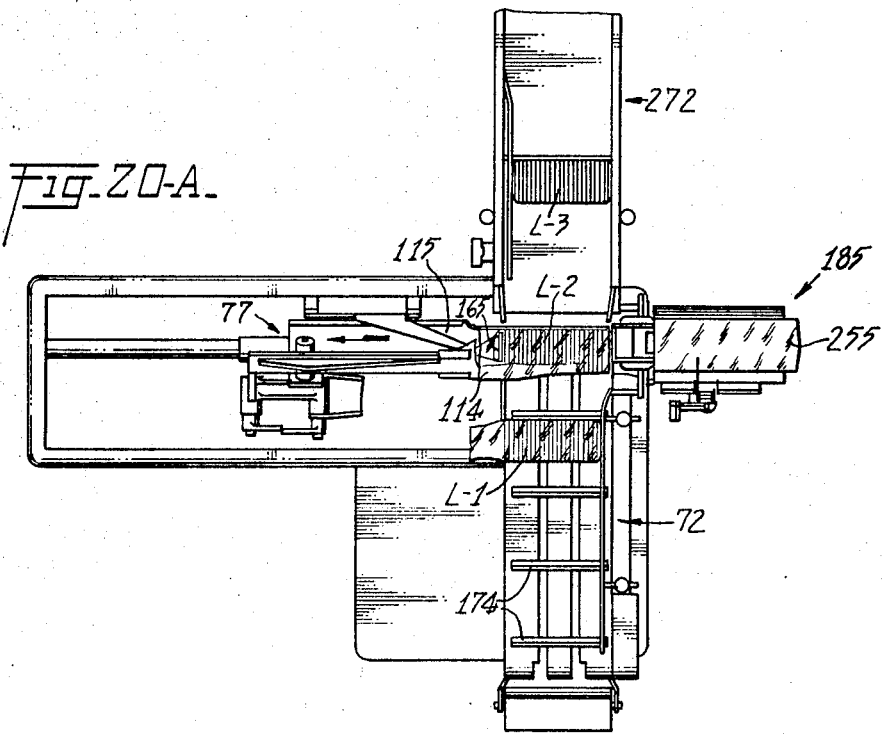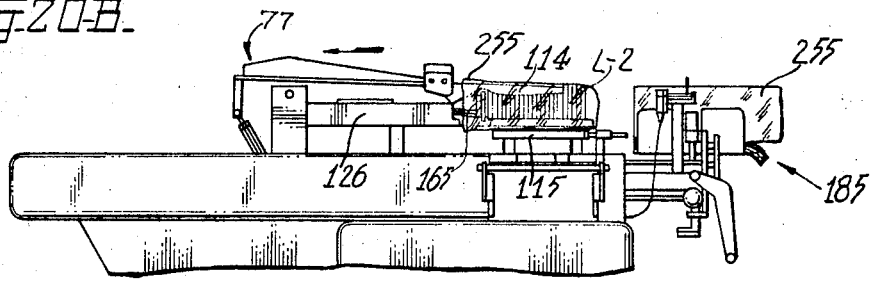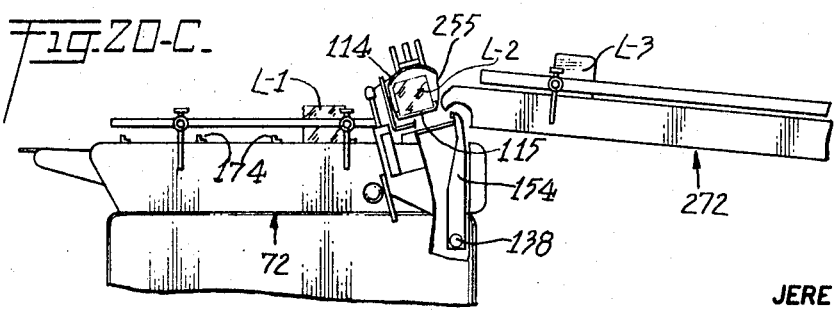

United States Patent Office 3,451,192
Patented June 24, 1969

3,451,192
BREAD BAGGER
Jere F. Irwin, Yakima, Wash., assignor, by mesne assignments, to American Machine & Foundry Company, New York, N.Y., a corporation of New Jersey
Filed Sept. 14, 1964, Ser. No. 396,430
Int. Cl. B65b 5/04
U.S. Cl. 53—190                                    33 Claims

ABSTRACT OF THE DISCLOSURE

Apparatus for bagging a product comprising a plurality of opposed members mounted for movement between first and second positions, means on one of said members for receiving and supporting a product, means for effecting relative expansible-contractible movement between said opposed members, means mounted adjacent said opposed members for supporting a bag, operating means for moving said opposed members toward said first position into said bag, expanding said opposed members within said bag to grip and support the same, and moving said opposed members and the bag held thereby toward said second position, and blockade means mounted between said first and second position for effecting relative movement between a product held by said receiving and supporting means and said bag as the opposed members move relative to the blockade means toward said second position, the bag thus being drawn over said product by said opposed members.

---

This invention relates to the packaging of commodities of various kinds in flexible plastic bags and particularly to a device for accomplishing the insertion of the commodity into the bag.

It is a primary object of the invention to provide a machine for automatically inflating a plastic bag and inserting deep in said bag, a commodity to be packaged therein.

Another object is to provide such a machine in which commodities may be readily bagged which heretofore have been found specially difficult to handle, such as a sliced loaf of bread.

A further object is to provide such a machine which retains an article to be bagged substantially in a given path of travel along a conveyor system while pulling a bag over said article, after which said article, thus bagged continues to travel along said path.

Still another object is to provide such a machine which is adaptable to bagging a wide variety of commodities differing in shape and size without substantial modification of said machine.

A yet further object is to provide such a machine which has automatic controls for halting the operation of the machine upon any failure of the means for coincidentally provding at the bagging station, on the one hand, an item to be bagged, and, on the other hand, an inflated bag for use in bagging said item.

Yet another object of the invention is to provide such a machine which "scoop feeds" the commodity into the bag.

It is also an object of the invention to provide such a machine which is readily adjustable to handle bags and commodities of various sizes and shapes within a substantial range.

The manner of accomplishing the foregoing objects as well as further objects and advantages will be made manifest in the following description taken in connection with the accompanying drawings in which:

FIG. 2 is a front elevational view of FIG. 1.

FIG. 8 is a fragmentary enlarged plan view of the blockade means of the invention.

FIG. 9 is a detail cross-sectional view of said blockade mechanism taken on the line 9—9 of FIG. 3 and of FIG. 8.

FIG. 10 is an enlarged fragmentary vertical sectional view taken on the line 10—10 of FIG. 3 and illustrates the bagged loaf flusher mechanism.

FIG. 11 is an enlarged plan view of the bag film stack supporting elevator together with the stack wicket trap and air jet nozzle of the device.

FIG. 12 is an enlarged fragmentary plan view of the scoop means of the invention in its maximum extended position and partly broken away to illustrate how at this moment a sliced loaf of bread is delivered into the lower scoop just prior to this loaf being bagged in the bag film which has just been picked up by an endmost portion of said scoop means.

FIG. 13 is a fragmentary plan view of said endmost portion of the scoop means just as this is about to be withdrawn from a bag after the latter has been pulled over a loaf of bread in enveloping relation therewith.

FIG. 14 is a fragmentary vertical sectional view taken in the line 14—14 of FIG. 12 and illustrates the manner in which a sliced loaf of bread is delivered into the lower scoop of said scoop means.

FIG. 15 is a fragmentary plan view of portions of the loaf feed and bagged loaf discharge conveyors and the inclined transfer deck between these on which a bagged loaf is deposited after the bagging operation, and which is shown in this view as being flushed downwardly from said deck by the flushing bar onto the bagged loaf discharge conveyor, while another unbagged sliced loaf of bread is being fed towards the end of the feed conveyor in readiness to be bagged during the next cycle of operation of the machine.

Figure 16:
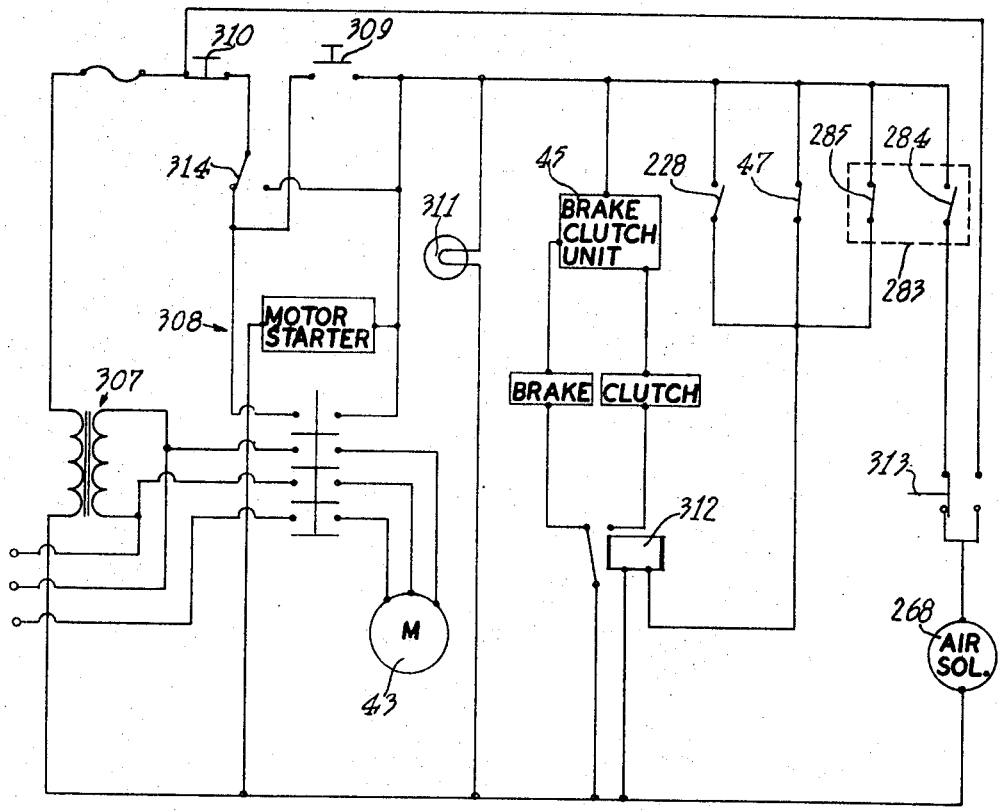

FIG. 16 is a wiring diagram of the electrical system of the invention.

FIG. 17 (A, B and C) comprises three views the first in plan, the second in end elevation, and the third in front elevation, which illustrate the operation of the machine of the invention at the beginning of a bagging cycle where the scoop means is in its retracted position.

FIG. 18 (A, B and C) comprises a similar three views illustrating said bagging cycle one-quater completed where the scoop means has advanced half way between its retracted position and its extended position.

FIG. 19 (A, B and C) comprises three views similar to those of FIG. 18 and shows said cycle half completed and with the scoop means in its fully extended position.

FIG. 20 (A, B and C) comprises three similar views which illustrates a further advanced stage in said bagging cycle of the machine in which the scoop means is returned approximately one-half of the distance from its extended position to its retracted position.

While the invention is basically adaptable to the packaging of many kinds of different commodities, it is disclosed herein in the form thereof designed particularly as a bread bagger 25. This machine is made commercially in right hand units and left hand units, and the machine shown on the drawings is of the former type.

The bagger 25 has a frame, generally designated by the number 26, and this includes a heavy foundation base 27 on which is superimposed what may be referred to as a first-story housing 28 and a second-story housing 29. The base 27 is made up of two heavy-inch plates 30 and 30′ which are placed on edge and welded together to form an L and are also welded to foot plates 31 and to a heavy L-shaped horizontal overlying floor plate 32. Inturned lower flanges 33 of the first story housing 28 are secured as by suitable cap screws 34, to the perimeter of floor plate 32.

Resting on and bolted to floor plate 32 is a heavy-duty worm-reduction-gear box 35 having a lower input shaft 36 and an upper ouput shaft 37. Mounted on a suitable pad 38 which is bolted on the floor plate 32 is a miter gear box 39 having an input shaft 40, which is in alignment with output shaft 37, and an output shaft 41 which is in the same horizontal plane and at right angles with shaft 40. Adjacent ends of shafts 37 and 40 are united together by a rubber coupling 42. Also resting on and bolted to floor plate 32 is an electric drive motor 43 which is connected by a drive belt 44 with a brake-clutch unit 45. This unit is electrically controlled, as will be explained later, and is in axial alignment with and connected to input shaft 36 of the worm reduction gear box 35 so that energizing of the motor 43 when the brake-clutch unit 45 is functioning to transmit rotation therethrough to input shaft 36, causes the output shafts 37 and 41 (as well as input shaft 40) to rotate at the same speed which, of course, is considerably slower than the speed at which input shaft 36 is rotated.

Mounted on the extending end of input shaft 40 of the miter gear box 39 is a switch cam 46 which cylically actuates a microswitch 47 mounted on the pad 38 for a purpose and in a manner which will be made clear in describing the operation. Rigidly fixed on the free end of output shaft 37 of the reduction gear box 35 is a pair of cams 51 and 52 which are jointly keyed to said shaft in the relatiive rotational relationship shown in FIG. 3.

An opening 53 is formed lengthwise of the machine in the floor plate 32 this opening extending alongside the heavy vertical frame plate 30 and lengthwise of the machine and having an L-shaped plate providing a floor plate 54 and a side plate 55. Mounted on the floor plate 54 is a self-aligning bearing 56 and concentrically therewith, on the side plate 55, is mounted a ball bearing 57 carrying a rocker 58 having individual arms 59 and 60 which are substantially at right angles to each other. Pivotally mounted at its lower end on the self-aligning bearing 56 is a scoop reciprocating lever 61 which is fashioned of sheet metal to make it light and rigid, and includes a back web 62 and channel flanges 63. Mounted on the back web 62 is a plate 64 having a lug 65 to which is pivotally connected to rear end of an adjustable pitman 66, the front end of which is pivotally mounted on a crank pin 67 provided on the cam 51.

Figure 3:
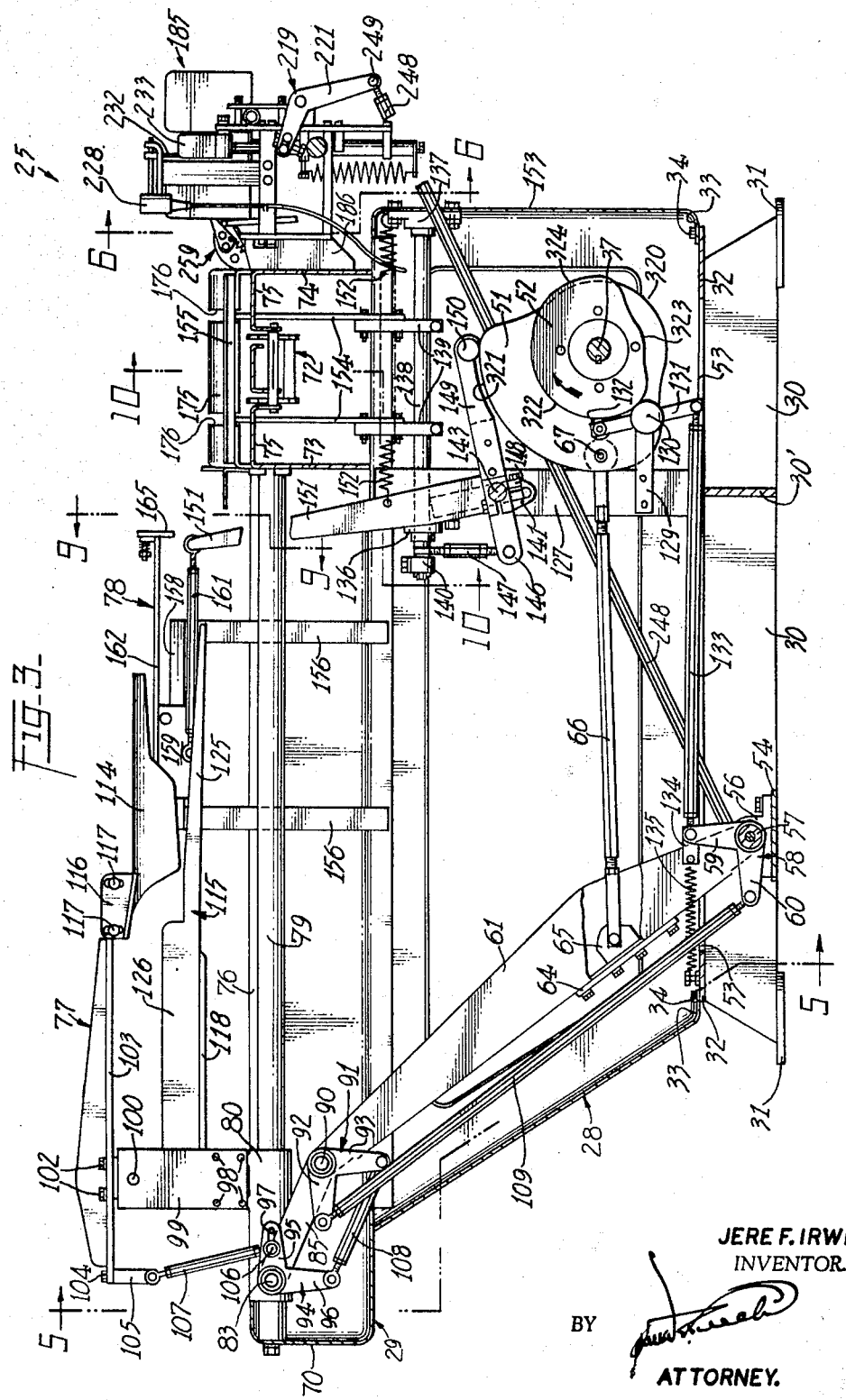
FIG. 3 is a vertical sectional view taken in line 3—3 of FIG. 2.

As clearly shown in FIG. 3, the first story housing 28 inclines upwardly and rearwardly at the rear end thereof to where it merges with the second story housing 29 which slightly overhangs the first story housing and is rigidly secured thereto as by welding. The second story housing 29 includes a longitudinal section 70 which is parallel with and extends directly over the opening 53 in the floor plate, and a transverse section 71 which functions as the housing for a discharge conveyor 72 and is provided with side walls 73 and 74 and a deck 75. The longitudinal section 70 of the second story housing 29 has a longitudinal opening 76 therein in which a scoop mechanism 77 and a blockade mechanism 78 are mounted and operate.

The scoop mechanism 77 includes a shaft 79 which is fixed at its opposite ends respectively on the rear end of longitudinal housing section 70 and on side wall 73 of transverse section 71. Slidably mounted on shaft 79 is a slide bearing 80 having a lug 81 which inclines and in the direction in which bread travels through bagger 25, upwardly at an angle of 15 degrees from vertical. A lug 82 extends horizontally from said bearing. The lug 81 extends horizontally from said bearing. The lug 81 is rectangular in shape whereas the lug 82 is cylindrical and has a tapped hole which receives a scoop pivot post 83 which journals in a suitable bearing provided in a bearing housing 84 provided at one end of an arm 85 having another like bearing housing 86 at its opposite end which is parallel with bearing housing 84 and contains a suitable bearing which lies between and is secured to the channel flanges 63 at the upper end of scoop reciprocating lever 61. The latter pivotal connection is made by a pivot post 90 which extends through said bearing and beyond one flange of lever 61 to provide a pivotal mounting for a rocker 91 having arms 92 and 93 formed at a right angle from each other. Similarly, scoop post 83 extends beyond the bearing in housing 84 to provide a pivotal mount for a rocker 94 having arms 95 and 96 disposed at a right angle from each other. The upper arm 95 of rocker 94 is provided with a slot 97 for a purpose to be made clear hereinafter.

Secured to rectangular lug 81 by screws 98 is a top scoop bearing mounting plate 99 having rigidly secured thereto a pivot pin 100 which rotatively journals in a bearing enclosed within a bearing housing 101 which is secured by screws 102 to a scoop operating bar 103. Secured by bolts 104 to the rear end of said bar is a top scoop control arm extension 105. Adjustably secured in slot 97 in arm 95 is a pin 106 the inner end of which is pivotally connected to the lower end of an adjustable link 107, the upper end of which is pivotally connected to the lower end of control arm extension 105.

Arm 96 of rocker 94, on the other hand, is pivotally connected to one end of an adjustable link 108, the opposite end of which pivotally connects to the arm 93 of rocker 91. The arm 92 of rocker 91, on the other hand, pivotally connects to one end of a relatively long adjustable link 109, the lower end of which pivotally connects to the lower arm 60 of rocker 58.

Figure 1:
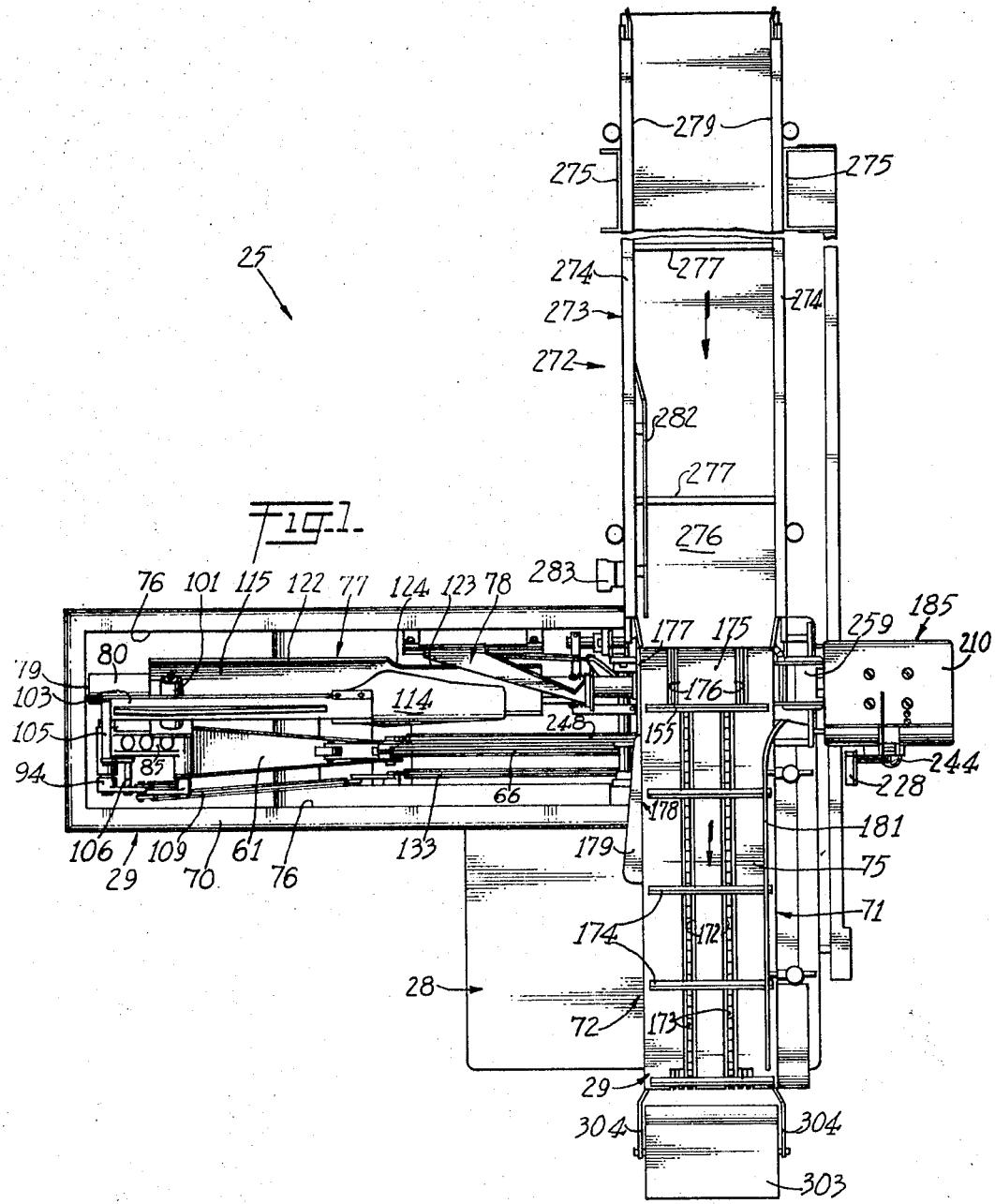
FIG. 1 is a plan view of a preferred embodiment of the invention with the scoop means thereof shown in retracted position.

The scoop mechanism 77 includes a top scoop 114 and a bottom scoop 115. The top scoop is shaped as shown in FIGS. 1 and 3 and has two vertically slotted fins 116 rising from a rear portion thereof, which fins extend alongside the scoop operating bar 103 and are secured thereto by screws 117, extending through said slots in said fins.

The bottom scoop 115 is much longer than the top scoop 114 and is mounted at its rear end on a scoop detaching bar 118 by screws 119 which extend through said bar and into a scoop mounting plate 120 which in turn is secured to the upper face of rectangular lug 81 by screws 121.

By virtue of the fifteen degree inclination from vertical of the rectangular lug 81, the entire scoop mechanism 77 mounted thereon is likewise so inclined. Apart from this inclination, which is laterally or crosswise with respect to the longitudinal axis of this mechanism, the axial center line of the rear half portion of the bottom scoop 115 is substantially horizontal while the center line of the front half of the bottom scoop inclines downwardly from horizontal at an angle of approximately three degrees. This is to assist in giving clearance from the scoop mechanism of bread being displaced therefrom by the blockade during a bread bagging operation. Somewhat more than the rearmost half of the upper side edge of bottom scoop 115 has a lip 122, that extends downwardly at about an inclination of fifteen degrees from the scoop bottom so that said lip is approximately horizontal. This lip is provided to assist delivery of a sliced load of bread over said lip and onto said bottom scoop.

The remainder of the upper side edge of the bottom scoop has a very low upturned flange 123 which terminates at its rear end in an outward flare 124. Slightly more than half of the front portion of the lower side edge of the bottom scoop 115 is provided with an upturned narrow flange 125 which gradually increases in depth from front to rear and finally merges with a relatively wide flange 126 which turns upward from the rear portion of the lower side edge of the bottom scoop.

Two bearing support posts 127 and 128 are mounted at their bottom ends on the floor plate 32 and are secured at their upper ends to adjacent portions of the housing 28-29. Post 128 has rigidly secured thereto an arm 129, on the end of which is provided a bearing housing 130 carrying a bearing on which an arm 131 is pivotally mounted, the upper end of this arm having a cam following roller 132 which is aligned with and follows the periphery of cam 52 while the other end of arm 131 is pivotally connected to one end of an extensible link 133, the opposite end of which is pivotally connected to the upper end of arm 59 of rocker 58. Also pivotally connected to said rocker arm is a clip 134 through which torque is applied to rocker 58 by a contractile spring 135 so as to hold the cam following roller 132 in constant contact with the periphery of cam 52.

Mounted on bearing support post 127 and upon the first story housing 28 are bearings 136 and 137 in which a shaft 138 journals. Mounted on said shaft between said bearings are flusher operating clamps 139 and a clamp arm 140 is mounted on an end portion of shaft 138 which extends inwardly beyond bearing 136. Mounted on posts 127 and 128 are a pair of bearings 141 and 142 in which a shaft 143 journals, this shaft having secured thereon a flusher drive clamp arm 146 which extends inwardly from said shaft and is pivotally connected to the lower end of an extensible link 147, the upper end of which pivotally connects with clamp arm 140. Also mounted on shaft 143 is a blockade actuating clamp arm 148 which extends upwardly from said shaft and has a bevelled face as shown in FIG. 2. Another clamp arm 149 is mounted on shaft 143 and has mounted thereon a cam follower roller 150 which rides on the periphery of cam 51.

Blockade operating clamp arm 148 has an upward extension 151 bolted thereto, this extension being connected by contractile spring 152 to the front wall 153 of first story housing 28 so as to maintain the roller 150 in constant contact with cam 51.

The flusher clamps 139 also have upward extensions 154 and a horizontal flusher bar 155 is mounted on the upper ends of these extensions.

Fixed to the second story housing 29 along the rear edge of the longitudinal opening 76 formed therein, is a pair of upwardly extending gib mounting bars 156, upward portions of which are inclined inwardly at 15 degrees with the vertical. Secured by screws 157 to the upper ends of bars 156 is a blockade gib 158 which is disposed horizontally and is deeply V-grooved along its upper and lower edges. A blockade mounting plate 159 having upper and lower runners 160 is bounted on gib 158 with said runners extending into the aforesaid grooves so as to render plate 159 freely slidable horizontally on said gib. Pivotally connected at its opposite ends to plate 159 and to the upper extremity of arm extension 151 is an adjustable link 161. By means of this connection, longitudinal shifting of the blockade mounting plate 159 on gib 158 is effected by cam 51, while this cam also functions to actuate horizontal flusher bar 155, as will be made clear in describing the operation.

Figure 4:
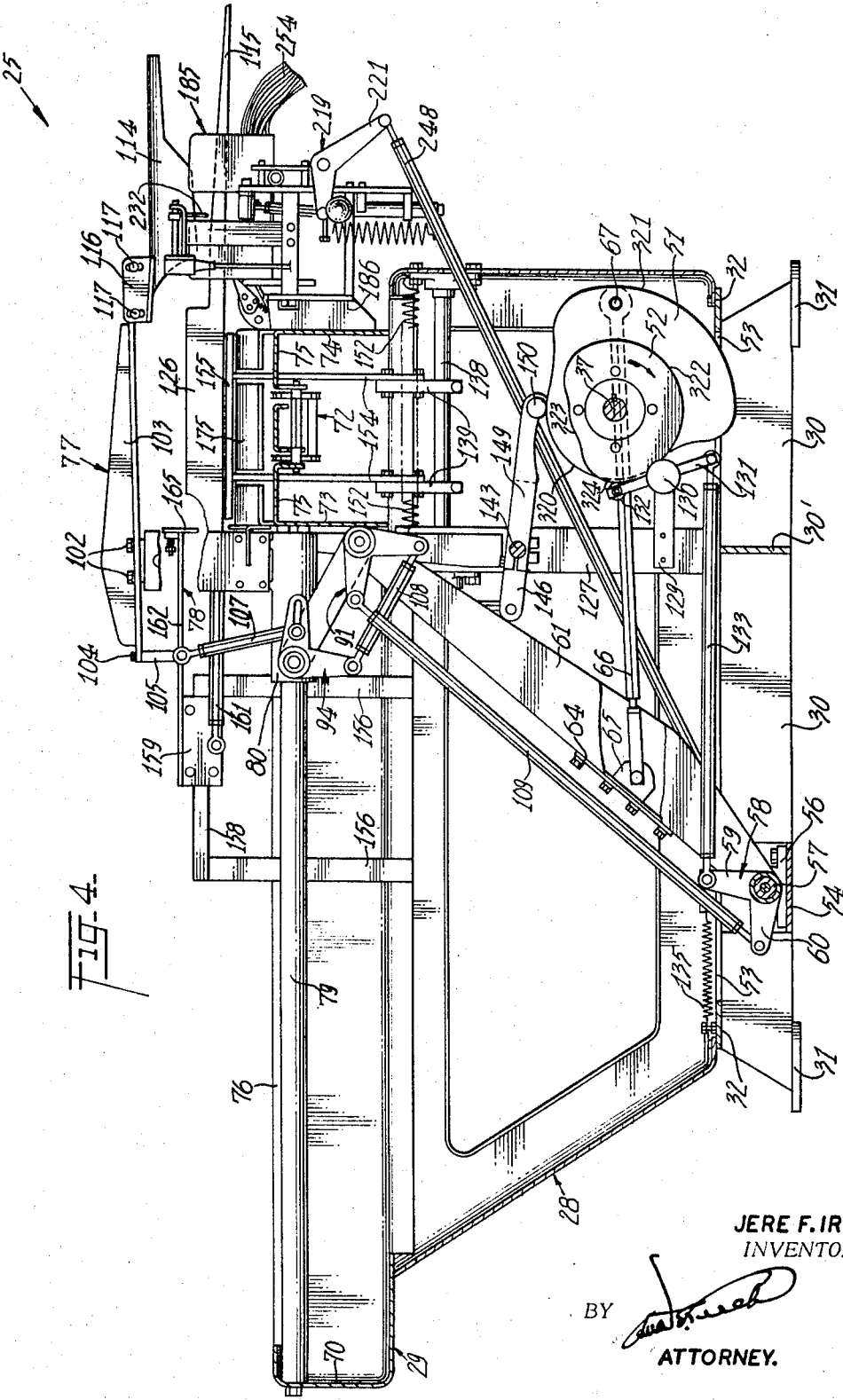
FIG. 4 is a view similar to FIG. 3 with the scoop means of the invention shown in its forwardmost extended position.
Figure 5:
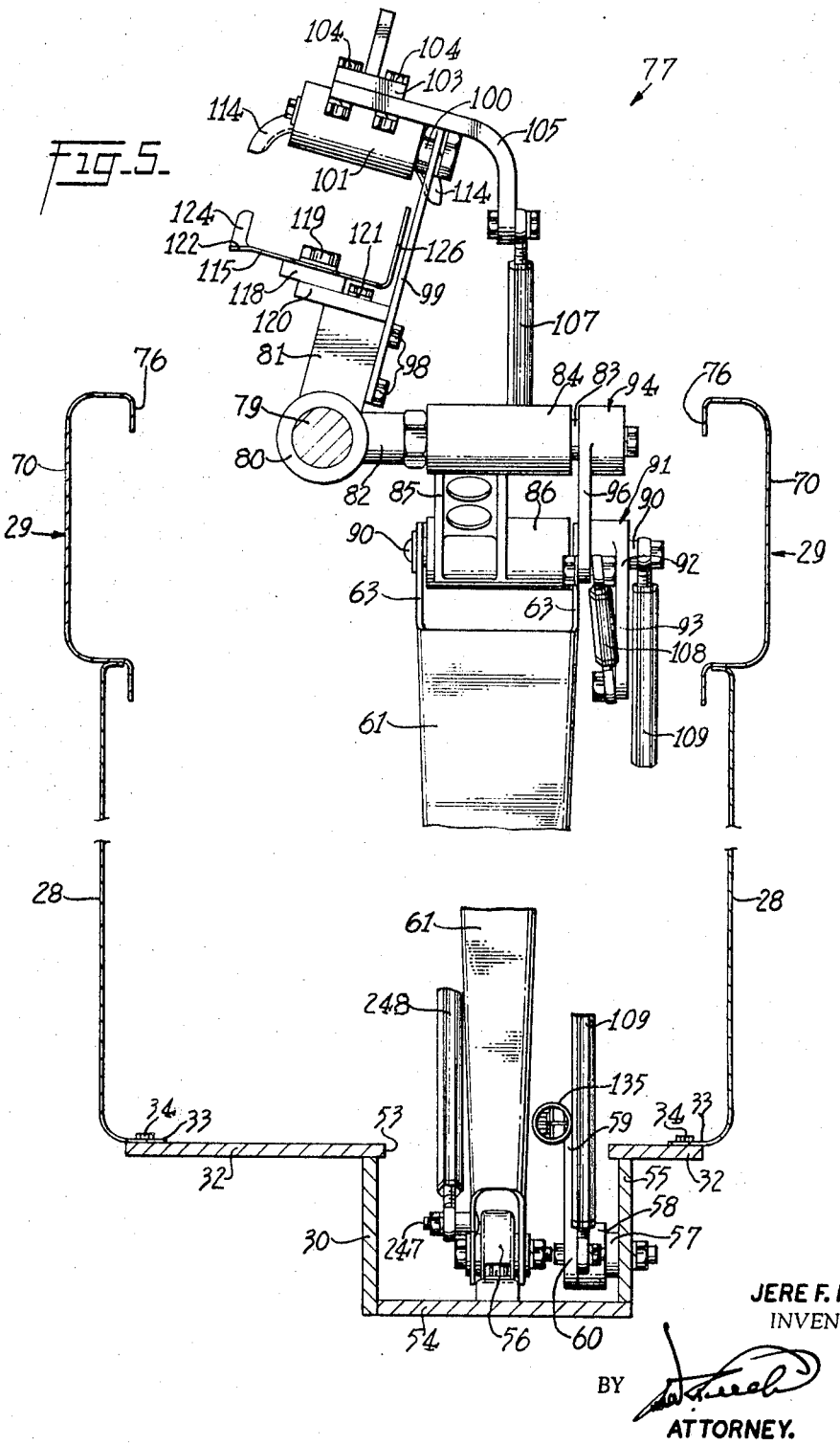
FIG. 5 is a diagrammatic fragmentary enlarged vertical sectional view taken on the line 5—5 of FIG. 3.

Secured, as by suitable screws, to plate 159 is a blockade supporting arm 162 which extends between the top and bottom scoops 114 and 115 and a substantial distance towards the front end of the machine as shown in FIGS. 3 and 4. Secured as by welding to the front end of arm 162 is a block 163 which is horizontally apertured to receive threaded studs 164 which are integrally provided on and extend rearwardly from a blockade 165, said studs having coiled expansion springs 166 which are held against block 163 by nuts 167 so as to yieldably mount blockade 165 on block 163.

It is to be noted in FIGS. 1 and 13 that the deck 75 of transverse housing section 71 has two slots 172 provided therein which conveyor chains 173 of discharge conveyor 72 are mounted to travel continuously during the operation of the bagger 25. Fixtd to chains 173, preferably at 9″ intervals, are loaf pusher bars 174.

At its right hand end, transverse housing section 71 provides a raised sloping deck 175 having a pair of slots 176 through which extensions 154 extend upwards so that flusher bar 155 sweeps the upper surface of deck 175 during each bagging cycle as will be made clear in describing the latter. Secured to side wall 73 of housing section 71, opposite deck 175 (see FIGS. 1 and 14), is a bagged loaf guide wall 177 the lower end of this guide wall joining with an adjacent end of a guide wall 178 which is mounted on the housing wall 73 and extends a substantial distance alongside discharge conveyor 72. Extending at right angles horizontally from the upper edge of guide wall 178 is a tapering flange 179 the width of which increases towards its terminal end.

Fixed to the housing sidewall 74 are guard rail mounting posts 180, on the upper ends of which a conveyor guard rail 181 is adjustably mounted horizontally so as to adjust the spacing between this rail and the guard wall 178 on the opposite side of the conveyor (FIGS. 1 and 2). The right hand end portion of guard rail 181 is curved to have a camming effect upon bagged loaves as these are initially delivered onto discharge conveyor 72 so as to fit the loaves snugly between the guard rail 181 and the guard wall 178.

Mounted on front wall 74 of discharge conveyor housing 71 so as to be symmetrical about the same inclined plane of symmetry as the scoop mechanism 77, is a bag film supply mechanism 185 (see FIGS. 1, 2, 3, 6, 7 and 11). Support for this mechanism is provided by an inclined block 186 and a somewhat shorter vertical block 187 which are spaced apart horizontally and are rigidly secured to the outer face of housing sidewall 74. Block 186 has a pair of vertically spaced horizontal tapped holes into which cap screws 188 and 189 are screwed and block 187 has a horizontal tapped hole into which cap screw 190 is screwed. The cap screws 188, 189, and 190 are supplied with washers and before being screwed into said tapped holes, are extended respectively through three slots 191 formed in a rectangular mounting plate 192 so that said slots are parallel with the upper and lower edges of said plate. Said slots are so provided in plate 192 that when this plate is so mounted on blocks 186 and 187, the end edges of plate 192 are parallel with the aforesaid inclined axial plane of bag film supply mechanism 185. The purpose of so mounting the plate 192 is to permit said mechanism to be adjusted in a direction normal to said axial plane.

Figure 6:
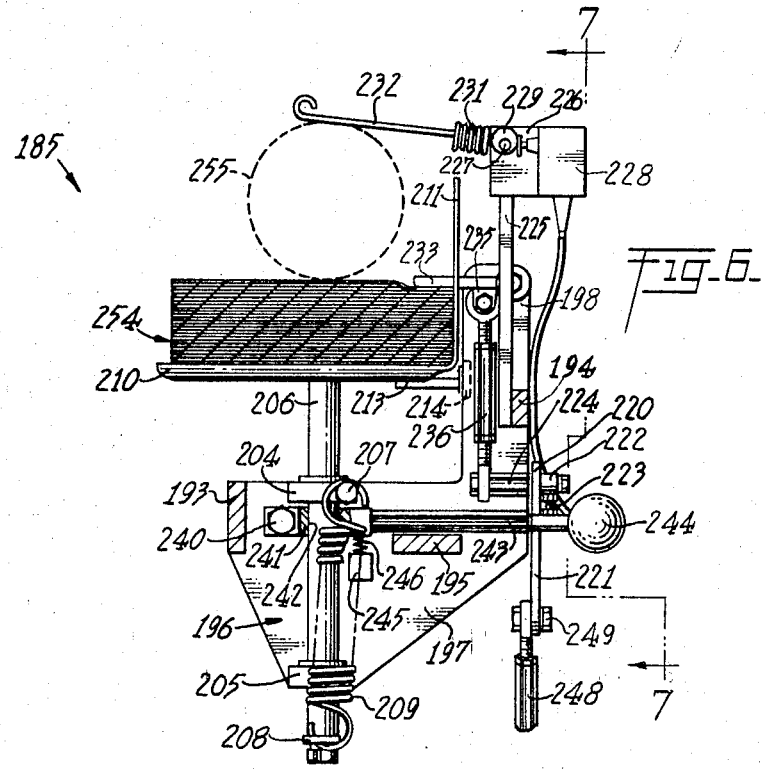
FIG. 6 is an enlarged fragmentary vertical sectional view taken on the line 6—6 of FIG. 3 and illustrates the bag film stack supporting elevator and control mechanism thereof.

Rigidly mounted on plate 192 in parallel relation therewith, and disposed forwardly therefrom, by spacer bars 193, 194 and 195, is a front plate 196, the outline of which may be seen in FIGS. 2 and 6 as embracing a triangular lower portion 197 and a post 198 which extends integrally upwardly from the left corner of portion 197.

Mounted rigidly on plate 196 and extending inwardly therefrom are bearing blocks 204 and 205 which have coaxial bores which provides sliding bearings for an elevator shaft 206. Block 204 has a screw 207 and the lower end of shaft 206 has an apertured clip 208 secured thereto and opposite ends of a contractile spring 209 attach to said screw and said clip so as to constantly bias shaft 206 upwardly.

Mounted on the upper end of shaft 206 is a plane normal to said shaft is an elevator table 210 which is made of sheet metal and one side portion of which is bent upwardly to form a table side wall 211, the latter having a wide slot 212 formed centrally therein, the full height of said wall. Mounted on the bottom of table 210 is a block 213 which carries a roller 214 which fits within a guide way formed by post 198 and a plate 215 which is mounted on said post in parallel spaced relation therewith. Mounted on front plate 196 and extending forwardly therefrom is a boss 218 (FIGS. 2 and 7) on which is pivotally mounted a rocker 219 having arms 220 and 221. Fixed on arm 220 and extending outwardly therefrom is a block 222 having a tapped vertical aperture for adjustably receiving a screw 223 the purpose of which will be made clear later. Also fixed on arm 220 and extending inwardly therefrom is a rod 224.

Rigidly fixed on spacer bar 194 and extending upwardly therefrom is a post 225 on the upper end of which is mounted a bracket 226 providing bearings for a shaft 227 and a mounting for a microswitch 228. Mounted on shaft 227 for operating said microswitch is an eccentric 229 and a block 230 in which is mounted a coil spring 231 the outer portion of which is straightened to form a finger 232 which overlies elevator table 210 and is located opposite the slot 212 formed in table side wall 211. A bag film stack hold-down arm 233 is pivotally mounted by a pin 234 provided on post 198 and has a pair of ears 235 through which it is pivotally connected to the upper end of an adjustable link 236, the lower end of which pivotally connects to the inner end of rod 224 which is fixed on arm 220 of rocker 219.

Pivotally mounted by a screw 240 on front plate 196 is a clutch block 241 which is provided with an aperture 242 through which elevator shaft 206 is readily slidable but which is large enough so that, when block 241 is swung upwardly about this pivot, it will bind against shaft 206 and prevent the latter responding by an upward movement to the bias of contractile spring 209. Block 241 is provided with a control rod 243 which is rigidly fixed thereto and which terminates at its outer end in a ball 244. Spacer bar 195 is in a position to provide a downward rest for rod 243 which will position clutch block 241 with its aperture in alignment with shaft 206 so as to permit the latter to freely slide through said block. Also provided on front plate 196 is a stud 245 and an expansive spring 246 is compressed between said stud and clutch block 241 on the opposite side of the latter from its pivot screw 240, this spring lifting said block into clutching relation with shaft 206 when rod 243 is free from downward pressure. Such pressure may be applied manually through the ball 244 or it may be applied through the screw 223 during each bread bagging cycle of the bread bagger 25. The manner in which this occurs will be made clear in the description of the operation.

Pivotally connected at its lower end by a bolt 247 to scoop reciprocating lever 61 a short distance above the pivotal mounting of said lever on bearing 56 is a relatively long adjustable link 248, the upper end of which is pivotally connected by a screw 249 to the lower arm 221 of rocker 219.

The elevator table 210 is provided to hold a stack 254 of polyethylene bag film in which the individual film 255 forming each bag preferably has a tongue of film 256 which extends beyond the open end of the bag, this tongue having holes 257 through which a wire wicket 258 is extended for binding and handling the stack 254 and mounting the same in the bag film mechanism 185. This mechanism thus includes a wicket trap 259 which also provides a mounting for an air nozzle 260 from which air is delivered in one or more jets towards the mouth of the topmost bag 255 in stack 254 so as to inflate this bag with air in readiness for its being made use of in a bagging operation. The wicket trap 259 includes a base plate 261 which is mounted on side wall 74 of discharge conveyor 72, and parallel end plates 262 between which the air nozzle 260 is mounted so that apertures 263 provided therein direct jets of air from said nozzle in the direction of the topmost bag 255 in stack 254. The lower edges of end plates 262 are connected together by a bottom plate 264 and forward portions of said end plates are provided with notches 265 into which wicket 258 is inserted when employing this wicket to deliver a stack 254 of film 255 onto the stack elevator. A spring biased latch 266 is also mounted on the outer face of each of the end plates 262 so as to hold the wicket 258 in notches 265 until these spring latches are manually lifted to remove a wicket from the wicket trap 259 and replace this with a new wicket-bound stack of film 254.

The air nozzle 260 is connected through a hose 267 to a solenoid controlled valve 268 which connects to a conventional supply of air constantly under pressure.

The bread bagger 25 also includes a sliced bread feed conveyor 272 which delivers sliced loaves 273 to the bagger 25 in timed relation with the latter so as to produce a continuous automatic bagging operation as long as the bagger is supplied with bag film and bread. Conveyor 272 includes a frame 273 having inturned side channel members 274 which are supported by channel legs 275 at the bread receiving end of the conveyor and by the second story housing 29 of the bread bagger at the discharge end of said bread feed conveyor. The side members 274 are united by a flat steel deck 276 over which loaves of bread are propelled by cross bar pushers 277 opposite ends of which connect with endless conveyor chains 278 which are recessed laterally into the side members 274 so as not to engage the bread while the latter is guided between outwardly facing channel members 279 which are adjustably mounted on the side members 274 so as to vary the spacing of the bread guides 279.

At the discharge end of bread feed conveyor 272, each of the bread guide channels 279 is provided with a pair of nylon rod bread guides 280 which is secured by a clamp 281 to said channel and extends towards the bread bagger 25 so as to guide each loaf of bread being discharged from the bread feed conveyor 272 and maintain it intact until said delivery has been effected.

Mounted in one of the bread guide channels 279 is a swinging bar 282 which is normally spring held, by the spring in a microswitch 283, so as to extend into the path of bread being fed along said conveyor, whereby said bread will engage said bar and actuate said switch whenever said bread is opposite said bar. The switch 283 is of the double pole variety and embodies two switches 284 and 285 the first of which is normally open and the second of which is normally closed (FIG. 16). The pusher bars 277 are preferably secured to the chains 278 on centers of 24" and these chains are constantly driven during the operation of the bread bagger 25 in timed relation with the bagged loaf discharge conveyor chains 173 by the following drive system.

As shown in FIG. 2, output shaft 41 of the bevel-gear box 39 is provided with a double sprocket 290 which connects with and drives the bagged loaf discharge conveyor 72 through an endless chain 291. Said sprocket 290 is also connected by an endless chain 292 with a sprocket 293 on a shaft 294 having a drive sprocket 295 which is connected by an endless chain 296 with a driven sprocket 297 mounted on a shaft 298 which is the drive shaft for sliced bread feed conveyor 272. The break in the endless chain 296 shown at the right end of FIG. 2 is to indicate that this chain may be extended rightward so that the bread slicer (not shown) which is normally provided for slicing bread for the conveyor 272 may also be driven by the motor 43.

Bagged bread discharged from the discharge conveyor 72 of the bread bagger 25 may be received on any kind of conveyor which is positioned to receive the same and the bagger is provided with a yieldable ramp 303 which is pivotally mounted on brackets 304 mounted on conveyor housing 71 and yieldably held in horizontal position by a contractile spring 305 to serve as a bridge over which the bagged bread may be thus delivered. In case the flow of bagged bread should jam at this point, the ramp 303 will yield downwardly, permitting bagged loaves of bread to be discharged downwardly into a basket placed to receive the same.

Referring now to the wiring diagram in FIG. 16, it is to be noted that drive motor 43 is a 240 volt 3-phase motor but that the rest of the wiring system is run on 120 volt single phase current produced by a transformer 307. The usual motor starter 308 functions through a conventional start switch 309 to start motor 43 and a stop switch 310 is used to the stop the same. A warning lamp 311 is illuminated as long as the motor is running. Through a control relay 312 the electrically actuated brake-clutch unit 45 is under the joint control of the inflated bag actuated switch 228, which is normally open, the cyclic actuated cam switch 47, which is normally closed but temporarily opens at the end of each bagging cycle, and the bread loaf actuated switch 285 which is normally closed when the machine is first started and no bread is being fed along the sliced bread feed conveyor 272. It is also to be noted that the solenoid controlled valve 268 must be energized in order to supply air under pressure to the air nozzle 260 and thus cause the topmost bag 255 on the stack 254 off these to be inflated. It is further noted that switch 284 which controls this valve is normally open before sliced loaves of bread start to be fed regularly to the sliced bread feed conveyor 272 and that thereafter this switch is closed causing air to be emitted continuously from said nozzle. The jog switch 313 shown in the circuit of the air solenoid 268 is provided for the purpose of trying out the air supply before a start is made on feeding sliced bread to the bagger and, if desired, even before starting the machine. This jog switch temporarily energizes the air solenoid 268 to turn the air on for the nozzle 260 while the finger is pressed on said switch but the supply of electricity to the solenoid 268 terminates, as far as the switch 313 is concerned, as soon as it is relieved of manual pressure.

A jog switch 314 is also provided for jogging the motor 43 where it is wished to cause the machine to operate through less than a full cycle of operation.

OPERATION

The electrical system 306, above described is designed to permit the bread bagger 25 to be started under any conditions, by pressing the start switch 309, without any malfunctioning resulting therefrom. In particular, it is designed to prevent a bag 255 being inflated so as to receive the top and bottom scoops 114 and 115, upon the maximum extension of these during any cycle of operation, when there is no sliced loaf of bread on the sliced bread feed conveyor 272 in a position to be fed into the "bread basket," so to speak, of the bottom scoop 115 while the latter is so forwardly extended. Were such a thing possible, the scoops on their return to their retracted position would simply feed the bag, picked up at the point of their maximum extension, over the blockade 165 and this bag would interfere with the subsequent automatic operation of the machine.

The electrical system 306 is also designed to prevent the bread bagger 25 continuing to operate through a bread bagging cycle when a sliced loaf of bread is being advanced on the sliced read feed conveyor 272 for delivery into the bread basket of the bottom scoop while there is no inflated bag being presented in readiness to be picked up by the scoops while in their extended position and applied to said bread during the completion of that bread bagging cycle. On the other hand it is desirable (and electrical system 306 is designed to cause this) that the bread bagger 25 so operate as to be able to start the machine and have it run through a series of "dry run" cycles, so to speak, before the delivery of bread to the sliced bread feed conveyor 272 starts and have the inflating of bags held up so that no malfunctioning results from the machine repeatedly going through a series of dry run cycles. While so operating provision is made that whenever the feeding of one or more sliced loaves to the sliced bread feed conveyor 272 results in the delivery to the bottom scoop of a sliced loaf of bread in the proper timed relation with a forward extension of the scoops, the topmost bag 255 on the bag stack 254 will be inflated and be ready to be automatically picked up by the scoops and employed for bagging said sliced loaf. All of these requirements are automatically accomplished by the electrical system 306.

To illustrate how this is done, a dry run cycle of operation will first be described as well as the merging of this into a "wet run" cycle, which is to say, when supplies of both bags are sliced loaves of bread become available in the operation of the machine. It then will be pointed out how the electrical system 306 takes care of a temporary deficiency in supplying either sliced loaves of bread or bags to the bagger 25.

As this normally is the case, let us assume that the machine is first started after the elevator table 210 has been supplied with a stack 254 of polyethylene bag film, which comes 1,000 bags to the wicket. The latter step is accomplished by pressing the elevator table downwardly against the action of spring 209 to make room for the stack of film between the table and the wicket trap 259. The wicket 258 is then hooked into the notches 265 of the wicket trap 259 and the spring latches 266 allowed to snap in place so as to properly position the film stack 254 on the elevator table 210. The clutch lock 241 which normally prevents upward movement of the elevator table 210, yields to downward pressure on the latter thus permitting the table to be depressed when replenishing the machine with a fresh stack of bag film. A wicket 258 from which the bags have all been used can ordinarily be removed and a fresh wicket of 1,000 bags introduced in less than 15 seconds.

Assuming now that the bagger 25 is supplied with a fresh wicket of bag film but has not yet had any sliced loaves of bread delivered to the sliced feed conveyor 272, and that the bagger is started by pressing the start switch 309. This starts the motor 43 and the supply of current through normally closed switches 47 and 285 energizes the control relay 312 to deenergize the brake of the brake clutch unit 45 and energize the clutch of said unit so that the motor 43 rotates the input shaft 36 of heavy gear box 35 thereby setting in motion the entire apparatus of the bread bagger 25. The cam switch 47 being shown in FIG. 16 as normally closed, means that this switch is normally closed during a major portion of each bagging cycle. It is cam actuated to open the same only during a brief interval right at the close of each bagging cycle, with the scoop mechanism in fully retracted position.

A complete bagging cycle is performed by the bagger 25 for each revolution of the shaft 37, and the rotation of shaft 37 is normally continuous so that any particular position of the shaft 37 and the resulting positions of the cams 51 and 52 mounted thereon may be assumed as the point at which one cycle of operation ends and another begins. In the present description, the retracted position of the scoop mechanism 77 illustrated in FIGS. 1, 2, 3 and 17 series has been selected as marking the point where each cycle of operation begins and ends.

Immediately upon the start button being pressed and the motor 43 thus energized, the shaft 37 starts to rotate from the position in which this is shown in FIG. 3 and in which the scoop mechanism 77 is in its fully retracted position, the shaft rotating in the direction of the arrow shown adjacent thereto. At the moment the cycle starts, the cam follower roller 150 has just moved upwardly from an approximately 180 degree low section 320 of cam 51, onto an approximately 110 degree high section 321. This has resulted in the cycle being described starting with the blockade 165 in its retracted position and with the bagged loaf flusher bar 155 in its downward position, both as shown in FIG. 3.

The start of the cycle also finds cam roller 132 riding on a medium-high 165 degree section 322 on cam 52, about 90 degrees from where roller 132 will descend to ride on a 60 degree low section 323 of cam 52. The cam 52 also has, between the sections 322 and 323 thereof, a 45 degree high section 324 which has a slightly greater radius than the medium-high section 322.

The starting position of cam roller 132 on cam section 322 operates through the link 133, the rocker 58, the link 109, the rocker 91, the link 108, the rocker 94, and the link 107, to determine the angular position of the top scoop 114 about its pivot pin 100, and causes the top scoop to be spaced upwardly from the bottom scoop 115 a slightly less distance than its maximum spacing therefrom. When the cam roller 132 rides onto cam section 323 the scoops will be given their minimum spacing, and when the cam roller 132 rides onto cam section 324, the scoops will be given their maximum spacing. At the start of each cycle however the scoops 114 and 115 have their "medium" (or slightly less than maximum) spacing shown in FIG. 3.

The pivotal connection of the pitman 66 through the pin 67 with the cam 51 causes the arm 61 to rapidly shift the slide bearing 80 and the scoop mechanism 77 mounted thereon from the fully retracted position of these elements shown in FIG. 3 towards the fully extended position of these elements shown in FIG. 4. This movement involves a one-half revolution of shaft 37. During this half revolution, the roller 132 has rolled entirely off of cam section 322 and down onto low cam section 323 and then back up onto cam section 324. The roller 132 was on low cam section 323 when the shaft 37 had rotated a quarter revolution or half way between the fully retracted position of scoop mechanism 77 shown in FIG. 3 and the fully extended position of this mechanism shown in FIG. 4. In this half way position, with the roller 132 on low cam section 323, the upper scoop 114 was lowered to the minimum vertical spaced relation between the two scoops as shown in FIG. 18-B.

This decreasing of the vertical spacing between the scoops contracts their frontal area to where the continuation of the rightward movement of these scoops as the rotation of shaft 37 proceeds, would result in these scoops being inserted into an inflated bag 255 in case such a bag had been produced by energizing of the solenoid valve 268. FIG. 18-B shows such a bag inflated in readiness to receive the scoops, but this view illustrates a step in a "wet run" cycle of operation in which bread is being fed to the machine and at present *a dry run* of the machine is being described. In a dry run cycle, the solenoid valve 268 is not energized because switch 284 is open due to the fact that, in the absence of bread being fed along the conveyor 272 the double pole switch 283 remains unactuated. Thus the top bag in stack 254 remains flat.

There being ample vertical clearance between the bottom of scoop 115 and the wicket trap 259, and the switch finger 232 being swung downwardly by gravity out of the way of the scoops where there is no inflated bag present to lift said finger, the scoops 114 and 115, in completing the first half of a dry run cycle, merely glide smoothly to their rightward extended position over the bag film supply mechanism 185 and then, with the start of the second half of the cycle, glide equally smoothly back towards their fully retracted position at the conclusion of the cycle.

It should be noted that, as the bagger 25 approaches the midpoint in its cycle of operation, and after the tips of the relatively collapsed scoops 114 and 115 have penetrated the space above the bag film stack 254, the roller 132, riding upwardly onto the high cam section 324 of cam 52, suddenly increases the vertical spacing between scoops 114 and 115 from its *minimum* to its *maximum* as shown in FIG. 4. It is further to be noted in this connection that the extremities of the scoops 114 and 115, in their rightward extended positions, are advanced to a point beyond the bag stack 254 which makes it necessary that when an inflated bag 255 is available in the path of the scoops completing the first half of the cycle of operation, the ends of the scoops extend to and occupy the end of the bag before the end of the rightward movement of the scoops so that the scoops act, in their maximum spacing, to stretch the bag over the scoops and to tear the film tongue 256 at the mouth of the bag from around the wicket 258 and thus free the bag from the wicket so that when the scoops start their return movement, with the bag extended by and gripped internally by the scoops, there will be no resistance to the bag moving to the leftward with the scoops as the latter start the second half of their cycle of operation. This picking up of an inflated bag by the scoops, of course, does not take place in the dry run which we are now describing.

It is thus seen that nothing of consequence takes place in a dry run cycle of operation of the bagger 25. With no bag being inflated the scoop mechanism 77 merely reciprocates smoothly from its retracted position to its extended position and back to its retracted position. The significance of the various responses of the scoop mechanism 77 to the cam 52 are reserved for a cycle of operation in which bread is fed to the machine. It is nevertheless desired to make clear that until bread is so fed, the bagger 25 may be operated through any desired number of dry run cycles and dependence may be placed upon the arrival of bread, in a normal feeding of this to the sliced feed conveyor 272, to initiate normal bread bagging cycles of operation as the bread thus fed arrives at the station where this is to be delivered into the scoop mechanism 77 and a bag 255 drawn into enveloping relation therewith. It should also be noted, in connection with describing the dry run, that, when the first half cycle of operation is about three-quarters accomplished, the roller 150 rides down off of the cam section 321 of cam 51 onto the low section 320 thereof which swings the arm 151 so as to advance the blockade 165 from the position in which this is shown in FIG. 3 to the position of which it is shown in FIG. 12 and at the same time swings the arms 154 so as to return the flusher bar 155 from its downward position to its upward position in which it is shown in FIG. 14.

The slicer provided to regularly supply sliced loaves of bread to the conveyor 272 of the bagger 25, is timed to feed a sliced loaf onto this conveyor just in advance of each of the pusher bars 277 thereof as these bars travel continuously in the direction of the arrow on this conveyor in FIG. 1. It should further be pointed out that the bread conveyor 272 and the bagged loaf discharge conveyor 72 operate at different speeds, the ratio between these speeds being as 24 is to 9 so that the conveyor 72 travels nine inches, or the spacing on centers of the pusher bars 174 thereof, while the conveyor 272 travels twenty four inches or the spacing on centers of the pusher bars 277 thereof. This has the advantage of producing a relatively rapid delivery of each sliced loaf into the scoop mechanism 77, when the time comes for such delivery.

At the conclusion of the dry run cycle just described, the roller 150 is lifted up from low cam section 320 of cam 51 to high cam section 321. This movement of roller 150, as previously mentioned, retracts the blockade 165 to the position in which it is shown in FIG. 1 and causes the bagged loaf flusher bar 155 to be swung to its downward position as also shown in this view.

We are now ready to observe how the bagger 25 reacts when it has been started and has gone through a succession of dry runs cycles as above described without performing any work or getting into any trouble, and when the slicer (not shown) starts to feed sliced loaves of bread to the sliced bread feed conveyor 272. The loaves shown in the bagger 25 in the diagrammatic views FIGS. 17 series, 18 series, 19 series and 20 series are identified by reference numerals L–1, L–2 and L–3. This series of views starts with an illustration of a cycle of operation in which a loaf of bread *will be* bagged and which follows a cycle of operation in which a loaf of bread *was* bagged.

In FIG. 17–A we see that loaf L–1 is a loaf that was bagged in the immediately preceding cycle; loaf L–2 is a loaf which will be bagged in the cycle about to start, and loaf L–3 is a loaf that will be bagged in the next cycle following that which is just commencing.

Now, since we are describing the effect had upon the bagger 25 by the first loaf fed into the machine, let us assume that loaves L–1 and L–2 are not present in the machine and we can then trace the effect of loaf L–3 on the operation of the machine, assuming it to have been the first loaf fed in the machine. As shown in FIG. 18–A, loaf L–3 has not yet engaged the switch bar 282 of the sliced bread feed conveyor 272 so that switch 283 is still unactuated and switch 284 thereof is still open. The solenoid valve 268 is accordingly not yet energized and the scoop mechanism will continue to the right from the position in which this is shown in FIG. 18–A in a dry run reciprocation over the bag stack 254 before sliced loaf L–3 has progressed far enough to engage the switch arm 282 and actuate switch 283 which will close switch 284 and result in the inflation of the topmost bag on stack 254. Before this happens however the scoop mechanism has escaped leftward from over the bag supply mechanism and the current cycle of operation will have remained a "dry run" cycle.

During the next succeeding cycle, however, the return of the scoop mechanism to the position in which it is shown in FIG. 18–A will find load L–3 in the position of loaf L–2 shown in FIG. 18–A and this loaf will have been in engagement with switch arm 282 for some time so as to actuate the switch 283, close the switch 284, energize solenoid valve 268 and produce an inflated bag 255 as shown in FIGS. 17–A and 17–B and 18–A and 18–B so that, as the contracted scoops shown in the latter view continue to the right, they readily penetrate the inflated bag awaiting such penetration as clearly shown in FIGS. 19–A and 19–B. The expansion of the scoops within the bag and the shifting of the latter rightward to tear the lip of this bag from the wicket binding the same fees the bag from the wicket and unites the bag with the scoops so that it returns with the scoop mechanism as this starts backward towards its retracted position. Just before this return movement starts, the initial loaf fed into the machine, now represented by loaf L–2 in these operation views, is rapidly propelled by the pusher bar 277 immediately behind this so as to dump this loaf into the bottom scoop against the deep upturned downside flange 126 of the latter and in front of the blockade 165 as shown in FIG. 14.

A good plan view of this dumping operation is shown in FIG. 12. Immediately following this delivery of a sliced loaf into the bottom scoop 115, the scoop mechanism rapidly returns to its retracted position and FIG. 13 illustrates how the blockade 165 holds the sliced loaf against being carried with the scoop by frictional engagement therewith so that the right hand end of the loaf is engaged by the bottom of the bag carried by the scoop mechanism and this strips the bag from the scoop mechanism as the latter further retreats, this action being facilitated by cam following roller 132 travelling from over cam section 324 onto cam section 322, the radius of which is slightly less, thereby relaxing the grip which the scoop mechanism has internally on the bag 255 so that the bag readily slips off from the scoops and the scoops are withdrawn rapidly therefrom.

By virtue of the roller 150 remaining in contact with the low cam section 320 of cam 151 until just before the close of the cycle, the blockage 165 remains in its advanced position where it retains the sliced loaf of bread within the bag and in alignment with the discharge conveyor 25 until the scoop mechanism has entirely disassociated itself with the bag. At the same time the flusher bar 155 is retained in its uppermost position until just before the termination of this bagging cycle, but as the cycle terminates and the roller 150 rides up to the position in which this is shown in FIG. 3 onto the high section 321 of cam 51, the blockade 165 is rapidly retracted out of the mouth of the bag 255 in which a loaf has just been enclosed, and flusher bar 155 simultaneously sweeps this bagged loaf downwardly from the sloping deck 175 upon which it had gravitated, and into the path of a pusher bar 174 of discharge conveyor 72 which is just rising on the chains 173 to pass outwardly from beneath the lower edge of the deck 175.

The bagging of the loaf which was first fed into the machine has now been described and this loaf is in the position of bagged loaf L–1 shown in FIGS. 17–A and 17–B. The second loaf fed into the machine is now in the position of loaf L–2 as shown in these views of the third loaf fed into the machine is in the position of loaf L–3.

It is readily apparent from the foregoing description that as long as bread is fed to the bagger 25 so that a sliced loaf is provided of the right length and size directly in front of each of the pusher bars 277 and so long as a supply of bag film is provided, the bagger 25 will continue to automatically bag these loaves of bread and deliver the bagged loaves from the machine on to the conveyor 72. Whenever the bag film supply mechanism 185 runs out of bag film, the bag actuated switch 228 will open and when the scoop mechanism reaches its retracted position at the end of said cycle, switch 47 will be cam opened, and as switch 285 will at that moment be held open by loaves of bread on the conveyor 272, the relay 312 will be deenergized which actuates the brake clutch of brake-clutch unit 45 throws out the clutch and applies the brake and thus immediately halts the machine. A fresh supply of bag film is then provided by the attendant. As soon as the top bag of this is inflated; it lifts arm 232, closing air switch 228 which energizes relay 312 thereby causing the machine to resume operation.

In case sliced loaves of bread are intermittently fed to the conveyor 272, the bagger 25 will continue to run but there will be one "dry run" cycle of operation to each empty pusher bar 277 that crosses the delivery end of the conveyor deck 276. No matter how irregular the loaves are fed to the conveyor 272 each of the loaves so fed will be properly bagged by the bagger 25 so long as the latter is kept supplied with bag film.

Figure 7:
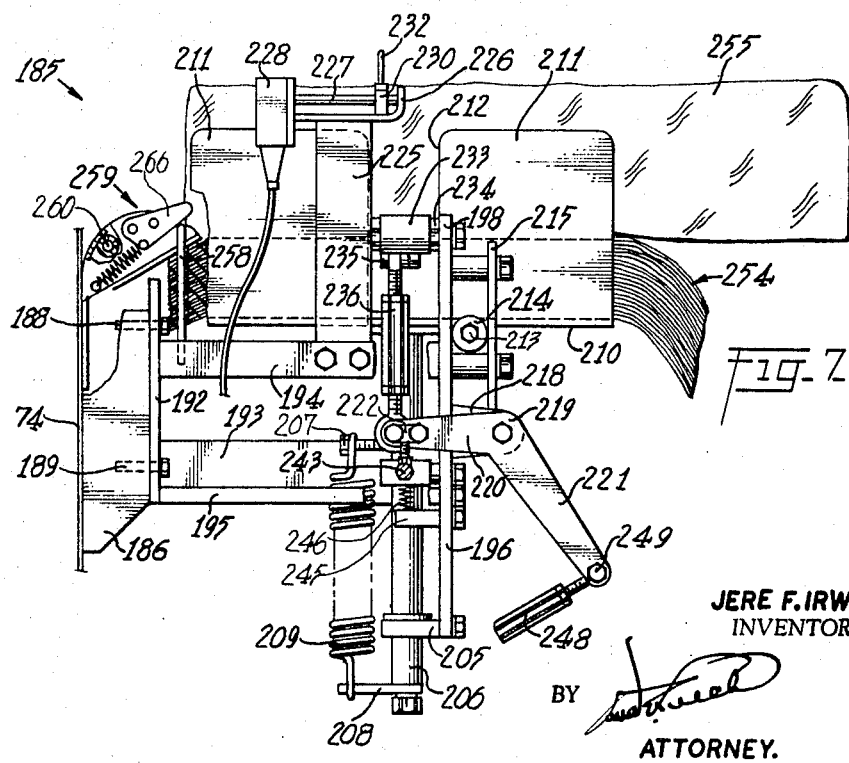
FIG. 7 is a vertical sectional view taken on the line 7—7 of FIG. 6.

The bag film mechanism 185 is provided with means for maintaining the upper end of the film stack 254 at approximately uniform level so as to assure inflation of the topmost bag of the stack whenever an air jet is directed thereagainst from the nozzle 260. This leveling means is comprised in the bag film stack hold down arm 233, the clutch block 241 and the means for operating these elements by the swinging of scoop reciprocating lever 61. The rocking of rocker 219 by the link 248 between the position in which this is shown in FIG. 3 and the position in which said rocker shown in FIG. 4 accomplishes this operation. At the beginning of a cycle of operation as shown in FIG. 3 the bag film stack hold down arm 233 is extending upwardly and the clutch block 241 is freed to lock the elevator shaft 206 from rising under the tension of spring 209. However, at the middle of the next following cycle of operation, as shown in FIG. 4, arm 233 is swung downwardly into a level position overlying the bag stack 254 and the screw 223 at this time engages the arm 243 and swings this down against the spacer bar 195 thereby relaxing the clutch block 241 and permitting the spring 209 to lift the stack 254 upwardly so as to snugly engage the upper bag in the stack with the hold down arm 233, as shown in FIGS. 6 and 7. As the cycle of operation progresses the hold down arm 233 is again swung upwardly, as shown in FIG. 3, thus releasing the uppermost bag of the stack 254 so that the air from nozzle 260 may inflate that bag thereby lifting finger 232 and actuating switch 228 as shown in FIG. 6. As the thickness of the stack 254 of bag film decreases as the bags in the stack are used up, the elevator 210 is thus allowed to gradually rise to maintain the top of the stack at a uniform operating level. As the stack hold down arm 233 swings upwardly toward the close of each cycle; its release of downward pressure on the bag stack coincides with the screw 223 rising (FIG. 3) to release the clutch block 241 so that the latter resumes its grip on elevator shaft 206, preventing further rising of the elevator table 210 during that cycle.

From the above description of a preferred embodiment of the invention and the operation thereof it is manifest that the goals stated at the outset have been abundantly achieved. The disclosure of the specific mode preferred for applying the invention to the bagging of one particular commodity is illustrative only and the invention should be understood as being widely applicable to commodities of every variety which are adaptable to bagging.

In making such applications, many changes and modifications would necessarily be made in the above disclosed embodiment without departing from the spirit of the invention or the scope of the appended claims.

I claim:

1. A product bagging machine comprising means for opening a bag, a bag handling device including a product supporting platform, means for operating said bag handling to move said device in one direction into an open bag, to expand it within said bag to grip said bag and to move it in a reverse direction, and means coacting with the movement of said device in the reverse direction for effecting the drawing of the bag over said product on said device and removing the product loaded bag from said device.

2. The invention defined in claim 1 wherein said bag handling device includes relatively contractible and separable members, and said means for opening said device includes means for effecting relative separating movement between said members to engage portions of said members with opposite interior walls of a bag, said members being operative in such state to frictionally hold said bag for movement over a product on said platform.

3. A product bagging machine comprising a loading station, means for positioning a bag adjacent said loading station, means for opening said bag, bag handling means, means for operating said bag handling means to move it in one direction into said opened bag, to adjust it within said bag to grip said bag and move it in a reverse direction, and means coacting with the movement of said device in the reverse direction for drawing said bag over a product at said loading station and, upon further movement of said device in the reverse direction for stripping said product loaded bag from said bag handling means.

4. The invention defined in claim 3 wherein said bag handling means comprise relatively separable bag expanding and holding means, and said means for opening said device includes means for effecting relative contraction between said members when they enter a bag and means for effecting relative expansion between said members into positions to grip and hold a bag for movement over a product to be bagged.

5. A product bagging machine comprising a loading station, means for positioning a bag adjacent said loading station, means for inflating said bag, bag handling means, mechanism for moving said last-named means in one direction into said inflated bag, to distend said bag and retain it on said bag handling means, and for moving said last named means in a reverse direction, and means coacting with the movement of said bag handling means in the reverse direction for effecting the insertion of a product at said loading station into said bag and, upon further movement of said bag handling means in the reverse direction, for stripping said product loaded bag from said handling means.

6. The invention defined in claim 5 wherein said bag handling means includes an elongated support member having a portion extending into the full length of said bag, and said stripping means including a member operative to effect a sliding movement of said product from said support member during said reverse movement of said bag handling means.

7. In a bagging machine for bagging a product, the combination of means for inflating a bag with one end open; contractible-expansible bag handling means axially aligned with said inflated bag; means for producing relative movement axially between said inflated bag and said bag handling means with the latter contracted to cause said bag to receive said bag handling means; means for expanding said bag handling means within said bag to engage and hold said bag; blockade means located axially with respect to said bag and spaced from the open end of the latter; means for receiving and positioning a product on said axis between said bag and said blockade means; and means for causing a reltaive movement axially between said bag and bag handling means and said bag and blockage means whereby said bag is drawn over said product while said product remains substantially stationary and means for continuing the relative movement between said bag handling means and said product and blockade means until said bag handling means and said product filled bag are separated.

8. The invention defined in claim 7 including means for effecting forward motion of said blockade to push the product to the bottom of a bag and strip said bag from said handling means during the retracting motion of said handling means, and means for separating said blockade means and said bag.

9. A product baging machine comprising means for opening a bag, a bag handling device, a loading station, means for operating said bag handling device to move it in one direction into an open bag, to adjust said device to grip said bag and to move it in a reverse direction, means for effecting the release of said bag from said device, and means coacting with said device for effecting the drawing of said bag over a product at the loading station and for effecting the removal of said product loaded bag from said loading station in response to the movement of said device in said reverse direction.

10. A product bagging machine comprising a loading station, means for positioning a bag adjacent said loading station, means for opening said bag, bag handling means, means for operating said last-named means to move it in one direction into said opened bag, to expand it within said bag to grip said bag and to move it in a reverse direction, and means for effecting the drawing of said bag over a product at said loading station and for stripping said product loaded bag from said bag handling means in response to the reverse movement of said bag handling means.

11. In a bagging machine for bagging a product, the combination of means for inflating a bag with one end open; contractible-expansible bag handling means axially aligned with said inflated bag; means for producing relative movement axially between said inflated bag and said bag handling means with the latter contracted to cause said bag to receive said bag handling means; means for expanding said bag handling means within said bag to engage and hold said bag; blockade means located axially with respect to said bag and spaced from the open end of the latter; means for receiving and positioning a product on said axis between said bag and said blockade means; and means for causing a relative movement axially between said bag and bag handling means and said bag and blockade means whereby said bag is drawn over said product while said product remains substantially stationary and means for continuing the relative movement between said bag handling means and said product and blockade means until said bag handling means and said product filled bag are separated.

12. The combination as claimed in claim 11 including means for effecting forward motion of said blockade to push the product of the bottom of a bag and strip said bag from said handling means during the retracting motion of said handling means, and means for separating said blockade means and said bag.

13. Apparatus for bagging a product, comprising:
a plurality of opposed members mounted for movement between first and second positions,
means on one of said members for receiving and supporting a product,
means for effecting relative expansible-contractible movement between said opposed members,
means mounted adjacent said opposed members for supporting a bag,
operating means for moving said opposed members toward said first position into said bag, expanding said opposed members within said bag to grip and support the same, and moving said opposed members and the bag held thereby toward said second position, and
blockade means mounted between said first and second position for effecting relative movement between a product held by said receiving and supporting means and said bag as the opposed members move relative to the blockade means toward said second position, the bag thus being drawn over said product by said opposed members.

14. Apparatus according to claim 13, further comprising:
means mounted adjacent said bag supporting means for inflating the bag prior to the movement of said opposed members therein.

15. Apparatus according to claim 14, further comprising:
means for operating said machine through successive bagging cycles, and
means responsive to failure of said bag inflating means to inflate a bag, when the product delivery means is operable to deliver a product, for halting the operating of the apparatus.

16. Apparatus according to claim 13, wherein:
said bag support means is operable to support a stack of bags positioned with the uppermost bag thereof at the proper level for receiving said opposed members, and
means are connected to said bag support means for maintaining the uppermost bag of said stack at said proper level although bags are progressively removed therefrom by the apparatus.

17. Apparatus for bagging a product, comprising:
a plurality of opposed members mounted for movement between first and second positions,
means on one of said members for receiving and supporting a product,
means for effecting relative expansible-contractible movement between said opposed members,
means mounted adjacent said opposed members for supporting a bag,
operating means for moving said opposed members toward said first position into said bag, effecting expansible movement between said opposed members within said bag to grip and support the same, and moving said opposed members and the bag held thereby toward said second position, and
blockade means mounted between said first and second positions for effective relative movement between a product held by said receiving and supporting means and said bag as the members move relative to the blockade toward second position, the bag thus first being drawn over said product by said members, and then the bag with the product therein being stripped from the opposed members as the blockade means hold the product against the portion of the bag furthest from said second position while the opposed members move further towards the second position.

18. Apparatus according to claim 17, further comprising:
means for slightly contracting said opposed members when said bag is being drawn over said product, to facilitate the stripping of said bag from said opposed members.

19. Apparatus according to claim 17, further comprising:
means for delivering a product to said product receiving and supporting means, and
means for conveying away the bagged product.

20. Apparatus according to claim 19, further comprising:
flusher means for delivering the bagged product to said means for conveying the same away.

21. Apparatus according to claim 19, further comprising:
means for rendering said inflating means inoperative pending the delivery of a product adjacent said product receiving and supporting means by said product feed means.

22. Apparatus for bagging a product, which comprises:
contractible-expandible scoop means mounted for reciprocal movement between a retracted position and an extended position, and having a lateral opening therein for receiving a product,
means mounted adjacent said scoop means for supporting a bag in axial alignment with the reciprocating movement of said scoop means,
operating means for moving said scoop means to its extended position whereat it is inserted into said bag, contracting said scoop means to facilitate its entering said bag, expanding said scoop means within said bag to distend the latter and retain the bag on said scoop means during subsequent movement, and moving said scoop means to its retracted position,
means for inflating said bag prior to the insertion therein of said scoop means,
means for feeding a product through said lateral opening into said scoop means while the latter is in its extended position,
blockade means mounted between said retracted position and the position of said opening when the scoop means is in its extended position for obstructing movement of said product with movement of the scoop means to its retracted position, the relative movement thus caused between said product and said scoop means effecting first the drawing of said bag over said product and said blockade and then the removal of said bag with the product therein from said scoop means, and
means for separating said bag and said blockade means.

23. Apparatus according to claim 22, wherein:
said scoop means includes a lower scoop and an upper scoop which is pivotably mounted relative to said lower scoop near the end of said upper scoop closest to said retracted position.

24. Apparatus according to claim 23, further comprising:
means for conveying away the bagged product, including a laterally sloping deck disposed beneath the area in which said bagged product is freed from said scoop means and blockade means, flusher means for sweeping the bagged product downwardly from over said sloping deck, and a discharge conveyor receiving said bagged product and conveying it from said machine.

25. Apparatus according to claim 22, wherein:
said bag support is operable to support a stack of bags positioned with the uppermost bag thereof at the proper level for receiving said scoop means,
said bag support, said blockade means and said scoop means all being mounted to function relatively in a plane cocked approximately 15 degrees from horizontal.

26. Apparatus for bagging a product, which comprises means for successively feeding individual products along a given path to a bagging station, scoop means reciprocating along a second path which crosses said first path in the area of said station, said scoop means having alternately a retracted position along said second path in which said scoop means is withdrawn from the area of said station, and an extended position in which said scoop means extends through and beyond said bagging station, bag supply means for supplying a distended bag to an end portion of said scoop means when this is extended beyond the bagging station, said scoop means extending within said bag and being operable to be expanded to grip the same for carrying the same with it as said scoop means through said bagging station, means on said scoop means, positioned opposite said bagging station when said scoop means is extended, for receiving a product fed to said bagging station, blockade means mounted at said bagging station for retaining a product at said bagging station during retraction of said scoop means, said bag being carried by the scoop means being thus drawn over said product and enveloping the same, the engagement of the product with the rear of the bag caused by the coaction of the blockade means, the product and the retracting scoop means being operable, upon further retraction of said scoop means, to withdraw the scoop means from said bag, and means for coordinately reciprocating said scoop means, operating said product feeding means, and operating said bag supply means to produce recurrent product bagging cycles.

27. Apparatus according to claim 26, further comprising:
control means for preventing said bag supply means from supplying a bag to said scoop means for use in any bagging cycle when said product feeding means fails to feed a product to said station to be bagged in that cycle.

28. Apparatus according to claim 27, wherein, said control means permits said machine to operate through any number of nonbagging cycles pending the presence of products adjacent said bagging station, and, in response to the presence of products adjacent the bagging station, activates said bag supply means, causing the latter to supply a bag for use in each cycle for which a product is delivered by said product feeding means to said bagging station, until the supply of bags in said bag supply means becomes exhausted, said control further comprising means responsive to the exhaustion of said supply of bags for stopping said machine until said supply of bags is replenished.

29. Apparatus according to claim 26 further comprising:
control means for halting operation of said apparatus at the beginning of any bagging cycle when said product feeding means is prepared to feed a product to said bagging station and said bag supply means fails to supply a bag for use in said bagging cycle.

30. Apparatus for removing a bag from a stack of bags, which comprises:
a plurality of opposed members,
means for effecting relative expansible-contractible movement between said opposed members,
means for moving said opposed members into said bag,
means for expanding said members within said bag while said members are adjacent said stack to frictionally engage the interior surfaces thereof so as to hold the bag for subsequent movement, and,
means for moving said opposed members engaging said bag away from said stack of bags.

31. Apparatus for providing an open bag at a packaging station, comprising:
a plurality of opposed members,
means for effecting relative expansible-contractible movement between said opposed members,
means for moving said members into a bag,
means for expanding said members within said bag to frictionally engage interior surfaces thereof so as to hold the bag for subsequent movement, and,
means for moving said members engaging said bag by said frictional engagement toward a packaging station.

32. Apparatus for providing an open bag at a packaging station, comprising:
a plurality of opposed members,
means connected to said members for providing relative expansible-contractible movement therebetween,
support means for a stack of bags mounted adjacent said members,
means for moving said members, while in a contracted relationship into the mouth of the topmost bag of said stack of bags,
means for expanding said members within said topmost bag while at said stack to frictionally engage interior surfaces thereof so as to hold the bag for subsequent movement, and,
means for moving said members engaging said topmost bag to remove the latter from said stack of bags and move it toward a packaging station.

33. Apparatus according to claim 32, further comprising:
means mounted adjacent said bag support means for inflating said topmost bag prior to the movement of said members therein.

References Cited

UNITED STATES PATENTS

| | | | |
|---|---|---|---|
| 848,099 | 3/1907 | Grant | 271—62 |
| 2,843,984 | 7/1958 | Dunning | 53—261 X |
| 2,850,855 | 9/1959 | Offuit | 53—27 |
| 2,950,589 | 8/1960 | Litchard | 53—190 |
| 2,973,610 | 3/1961 | Randall | 53—188 |
| 2,986,858 | 6/1961 | Randall | 53—190 X |
| 2,751,134 | 6/1956 | Walldow | 53—385 X |
| 3,206,913 | 9/1965 | Fleigher et al. | 53—189 |

THERON E. CONDON, *Primary Examiner.*

R. L. SPRULL, *Assistant Examiner.*

U.S. Cl. X.R.

53—261, 385